FREQUENCY MATCHING OF TWO ALTERNATING VOLTAGES

Filed Nov. 18, 1963

FREQUENCY MATCHING OF TWO ALTERNATING VOLTAGES

Sept. 19, 1967 R. L. GRIMSDALE ET AL 3,343,001

FREQUENCY MATCHING OF TWO ALTERNATING VOLTAGES

Filed Nov. 18, 1963 14 Sheets-Sheet 5

FREQUENCY MATCHING OF TWO ALTERNATING VOLTAGES

Filed Nov. 18, 1963 14 Sheets-Sheet 7

FREQUENCY MATCHING OF TWO ALTERNATING VOLTAGES

United States Patent Office 3,343,001
Patented Sept. 19, 1967

3,343,001

FREQUENCY MATCHING OF TWO ALTERNATING VOLTAGES

Richard Lawrence Grimsdale, Altrincham, Norman Geoffrey Depledge, Aspley, and Gordon Wilson Pickard, Manchester, England, assignors to Associated Electrical Industries Limited, London, England, a British company Filed Nov. 18, 1963, Ser. No. 324,441
Claims priority, application Great Britain, Nov. 23, 1962, 44,456/62
7 Claims. (Cl. 307—87)

This invention relates to improvements in frequency matching means and more particularly to frequency matching means for use in an automatic synchronizing system adapted to bring an "incoming" alternator into proper synchronism with an operating A.C. supply system and to effect closure of circuit breakers which then couple the incoming alternator to the supply system.

According to conventional power station practice, before paralleling an alternator with the National Grid System, the speed difference, the voltage difference and the phase angle difference between the incoming alternator and the grid system are brought to within prescribed limits. If paralleling is effected when one or more of these differences exceeds the prescribed amount an excessive shock disturbance is imposed on the incoming machine.

As the power rating of turbo-alternators increases, the permissible "differences" at paralleling become smaller since the power flow caused by any difference increases with the power rating of the machine.

The process of synchronizing is usually performed by an operator who manually adjusts the rotational speed of the alternator and the terminal voltage of the alternator to the correct settings and observes a synchroscope which has a pointer that rotates in one direction if the incoming machine is too fast, in the other direction if the incoming machine is too slow, and remains stationary at the 12 o'clock position when both frequency and phase are correct. This operator operates the contactor of the circuit breakers when the synchroscope indicates synchronism. The circuit breakers take a short time to operate and it is therefore necessary that the relative frequency between the alternator and the grid is very low at the moment of operation of the contactor if the contact breakers are to close within a few electrical degrees of synchronism.

An operator has to lower the alternator speed to a value which is very close to that of the grid so that if he closes the circuit breaker at synchroscope 12 o'clock, closure will be completed at only a small angle later. However, it is more desirable to synchronize at a small slip speed with the alternator running fast to that a definite amount of power is generated. This precludes the condition found when synchronizing is attempted at very small slip speeds when "motoring" and hence steam "blow off" could occur.

An object of the present invention is the provision of improved frequency matching means.

According to the present invention, in frequency matching means adapted to adjust the frequency of a first alternating voltage so that it matches the frequency of a second alternating voltage, first and second beat waveforms are produced by beating together the first and second voltages, one of the beat waveforms being caused to lag the other, each beat waveform is squared, a first pulse train is formed with the leading edges of the pulses produced by the leading edges of a first of the squared waveforms and a second pulse train is formed with the leading edges of the pulses produced by the trailing edges of the said first squared waveform, and the second squared waveform is compared with the first pulse train and with the second pulse train in means providing a first output when the pulses of the first pulse train occur during the mark periods of the squared beat waveform and providing a second output when the pulses of the second pulse train occur during the mark periods of the squared beat waveform, and means arranged to regulate the frequency of the first alternating voltage are adapted to increase that frequency upon the occurrence of the first output and to decrease that frequency upon the occurrence of the second output.

Suitably, the first and second alternating voltages are applied as inputs to the primaries of two separate transformers, each transformer including two secondaries and one secondary of each transformer being connected in series with one secondary of the other transformer to provide one of the two beat waveforms. The phase shift can be introduced into one of the two waveforms by a resistive-capacitive lag circuit. Suitably, the phase shift is substantially 45 degrees. Each squared waveform is produced by a circuit which changes state as the beat amplitude rises above and fall below a fixed level, whereby the change of state occurs at a fixed phase angle on the beat waveform independent of the beat frequency as long as the beat amplitude is constant.

Preferably the operations carried out on the beat waveforms were carried out in transistor circuits, and the second waveform is compared with the first pulse train in a first diode AND gate and the second squared waveform is compared with the second pulse train in a second diode AND gate, and the two AND gates control a bistable circuit which in one stable state provides the first output and in its other stable state provides the second output.

Under abnormal operating conditions it is possible for the relative speed between the generator and the system to decrease to zero and remain at this value for an appreciable period but with an attendant phase angle error rendering the conditions unsuitable for synchronizing.

The nudge circuit would provide a lower speed pulse every 15 seconds when the following conditions exist.

(a) The generator speed is not being raised.
(b) Both incoming and running voltages are present.
(c) A voltage match exists.

These pulses reduce the generator frequency below that of the system and the synchronizing cycle is repeated.

The invention will now be described by way of example, with reference to the drawings accompanying the specification, in which.

Figure 2:
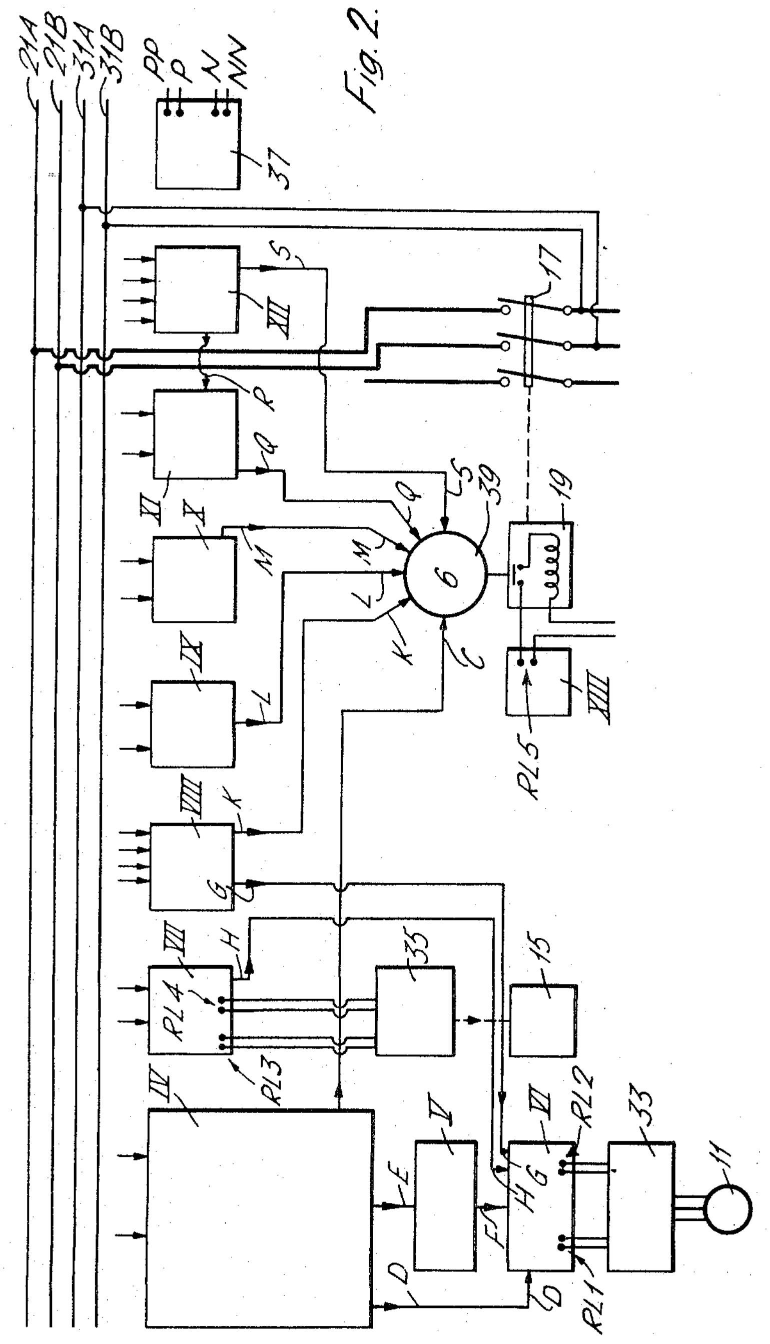
FIGURE 2 is a block diagram of control apparatus used in the automatic synchronizing and connecting of the turbo-generator to the grid.
Figure 4:
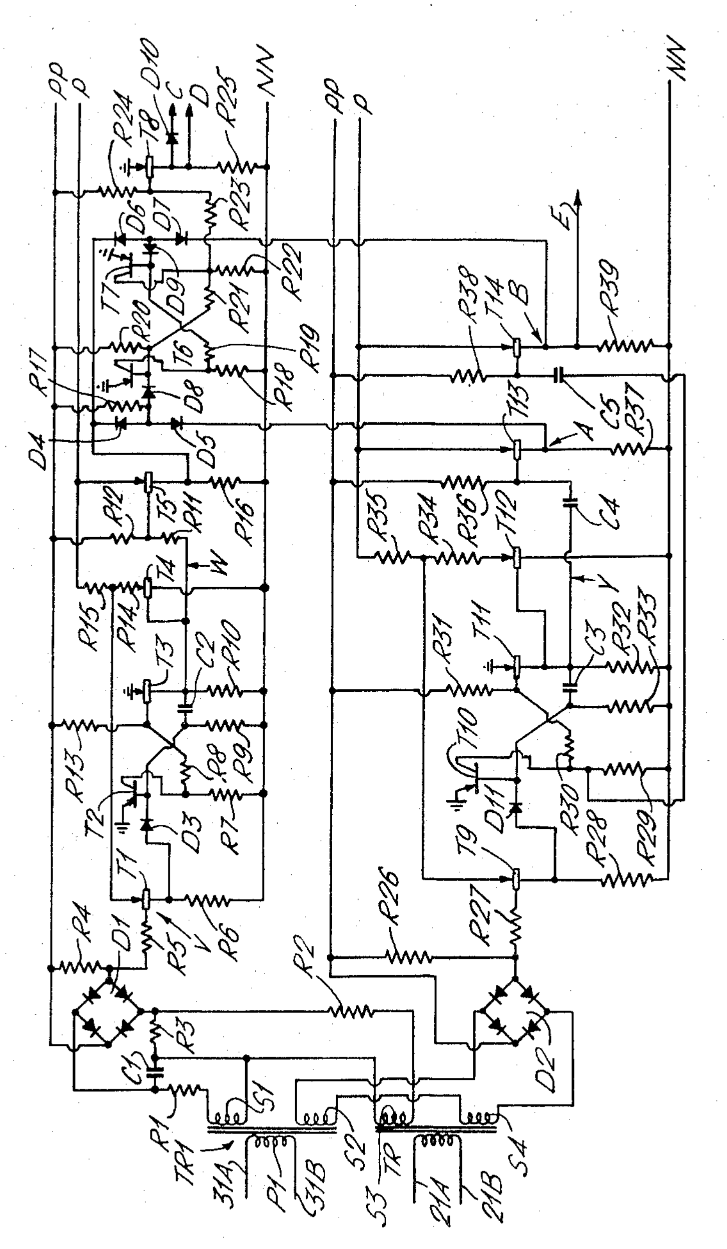
FIGURES 4 to 13 are circuit diagrams of units shown in block form in FIGURE 2, as under.
Figure 5:
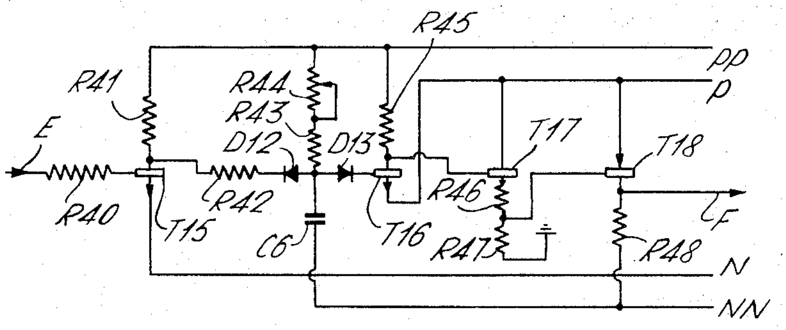
Figure 6:
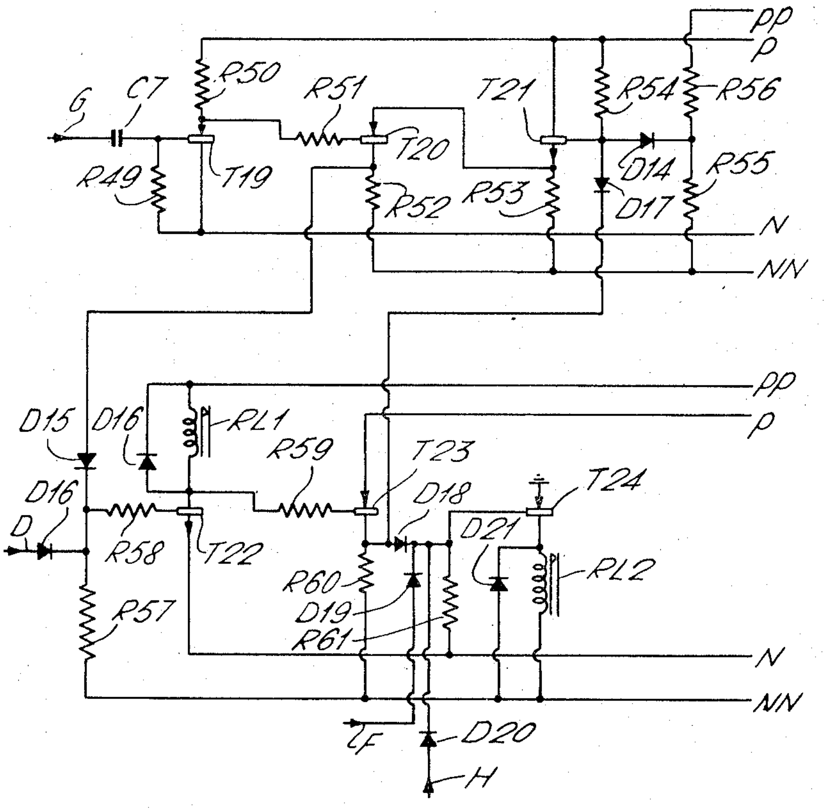
Figure 7:
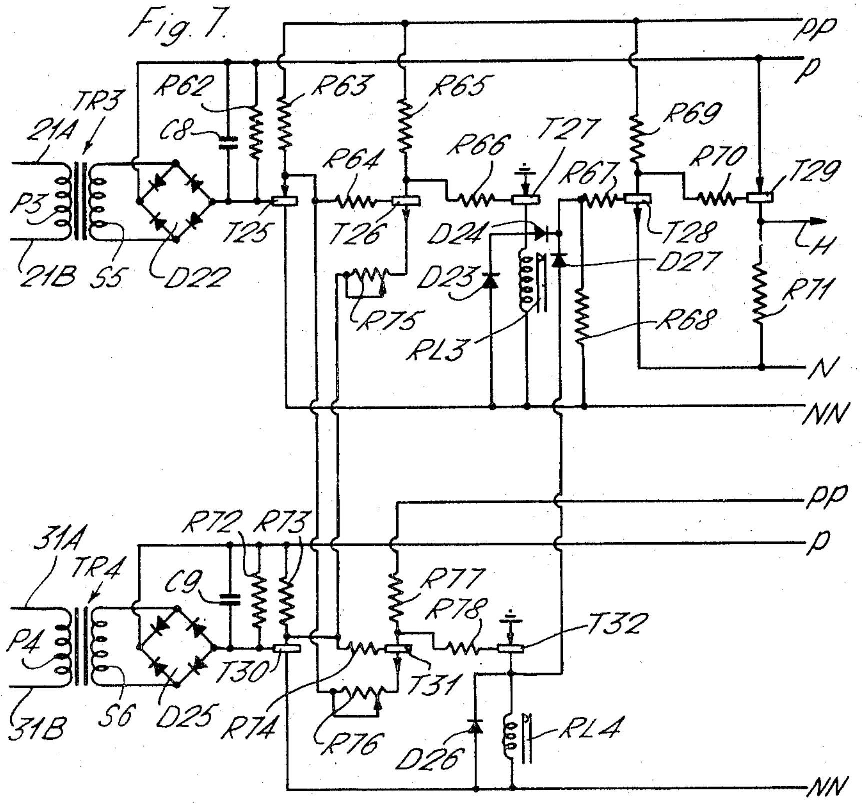
Figure 9:
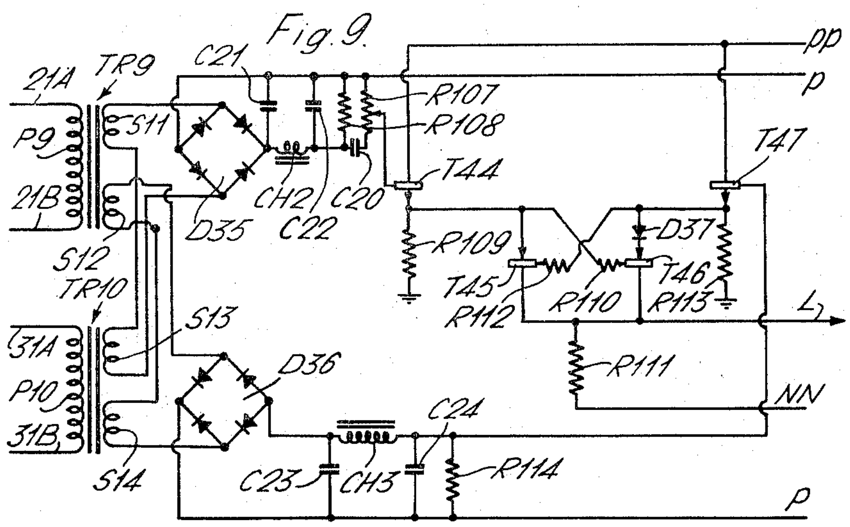
Figure 8:
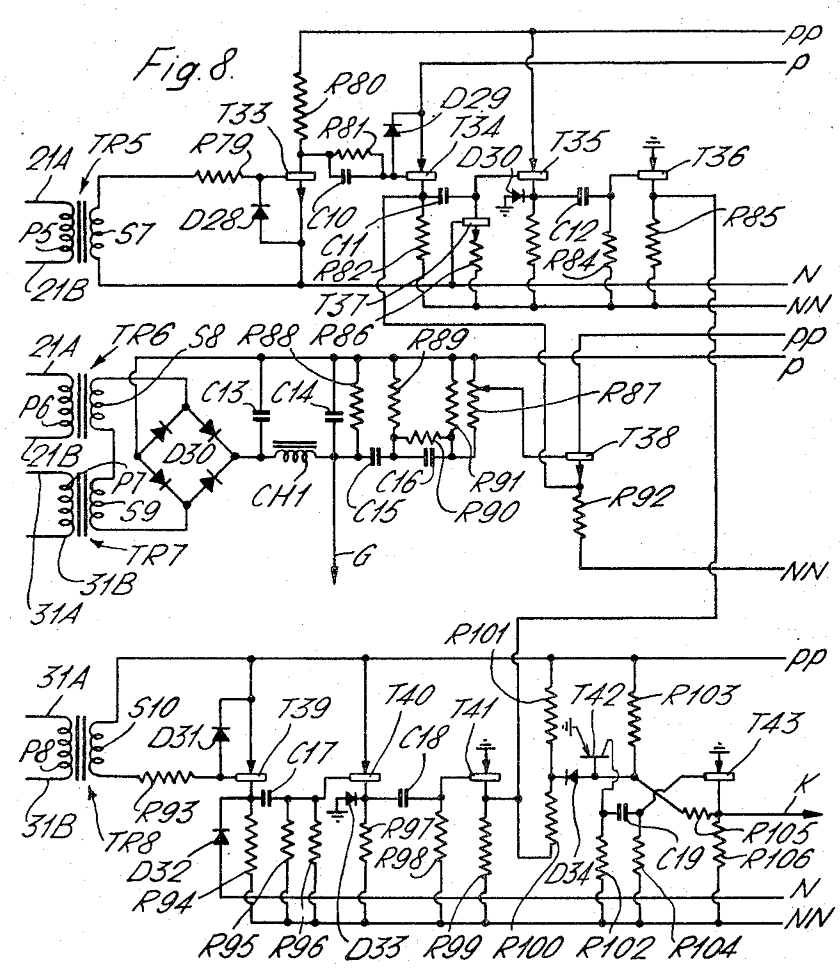
Figure 10:
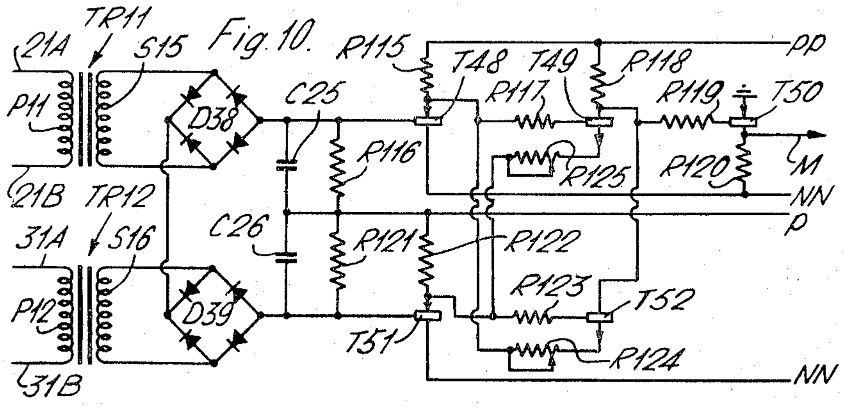
Figure 11:
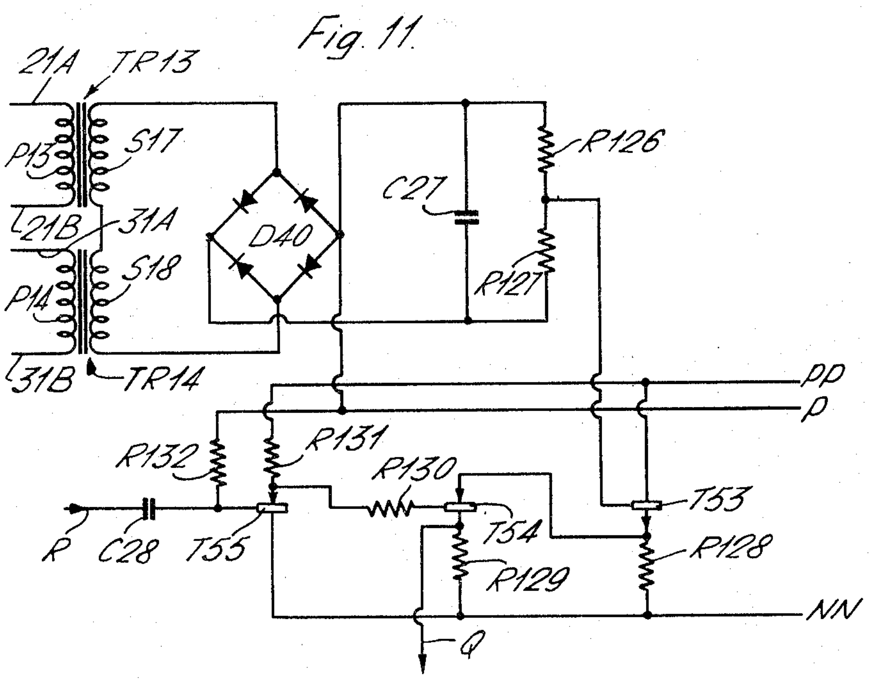
Figure 13:
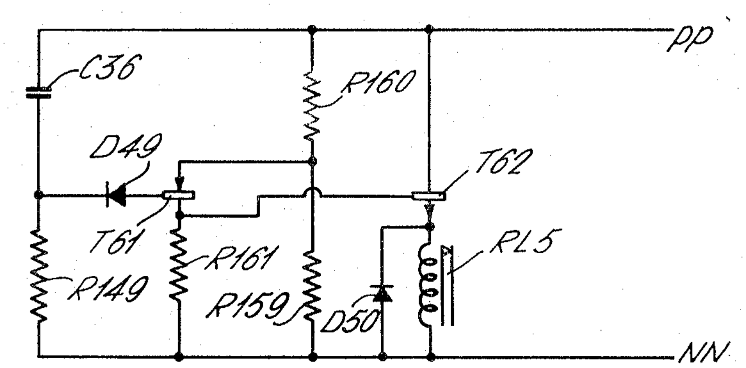
Figure 12:
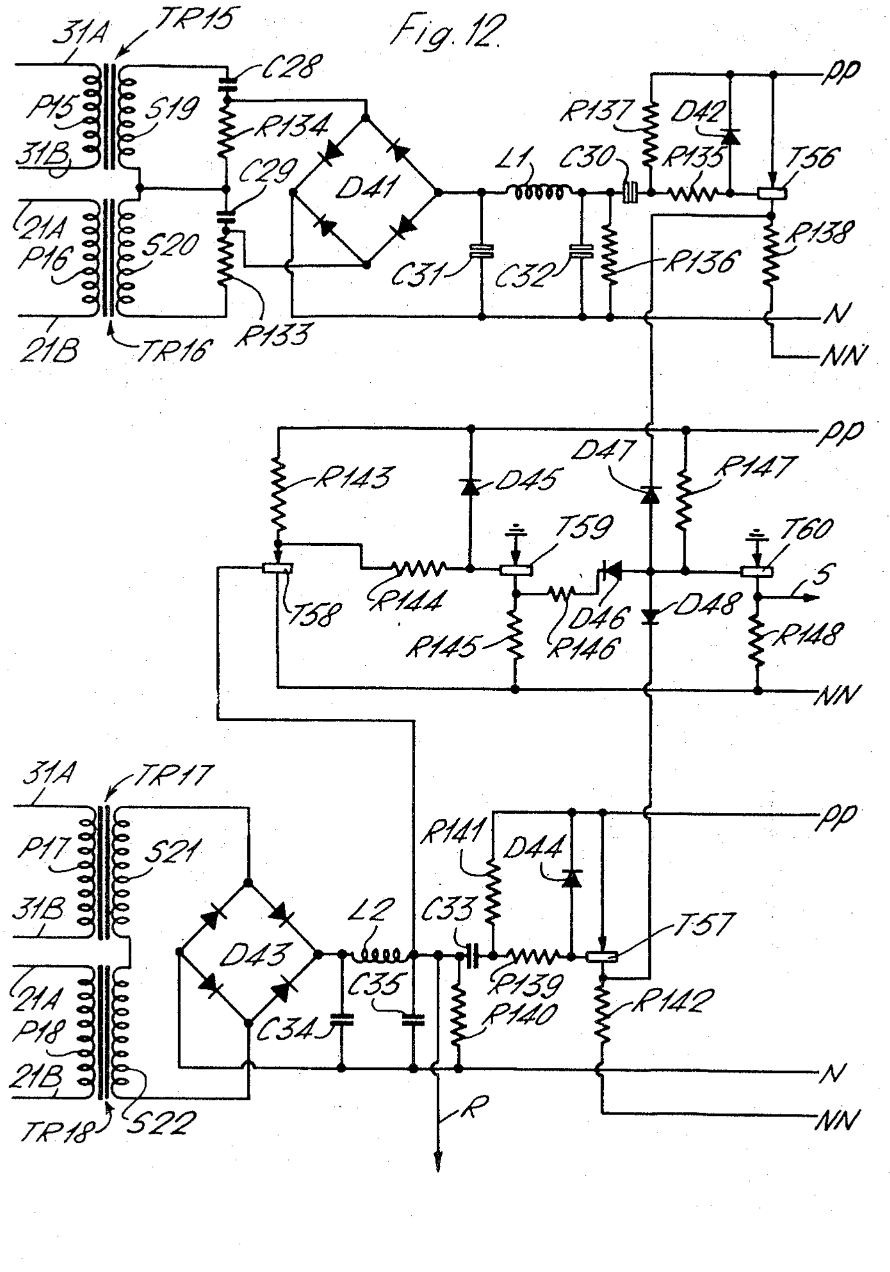
Figure 14:
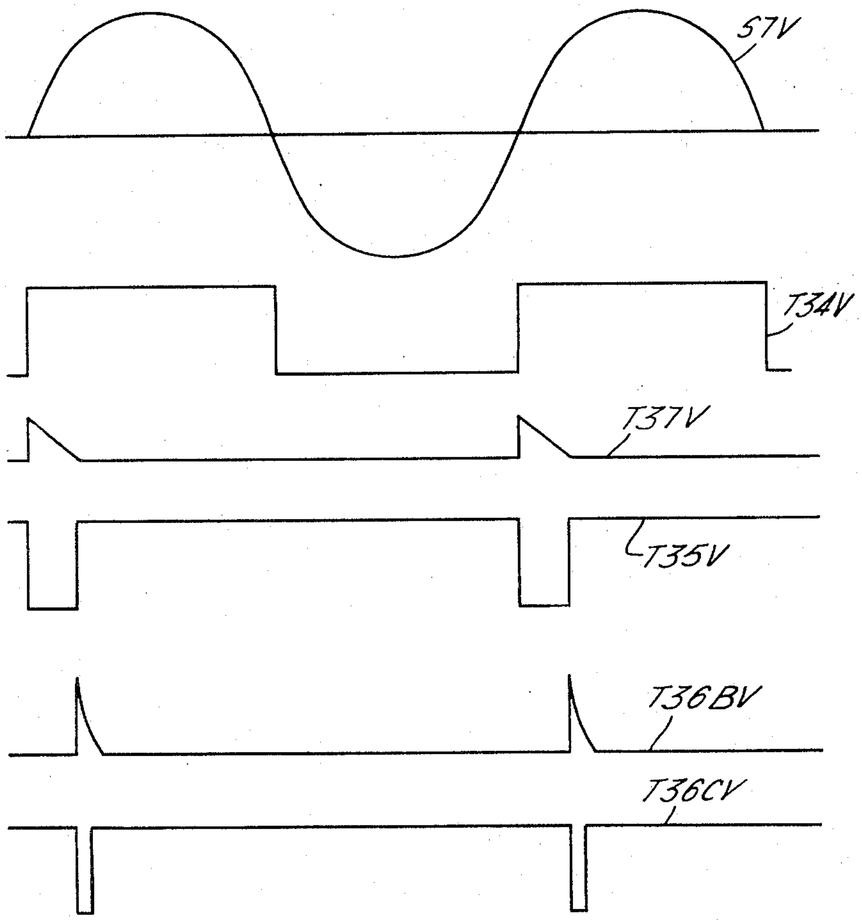
Figure 15:
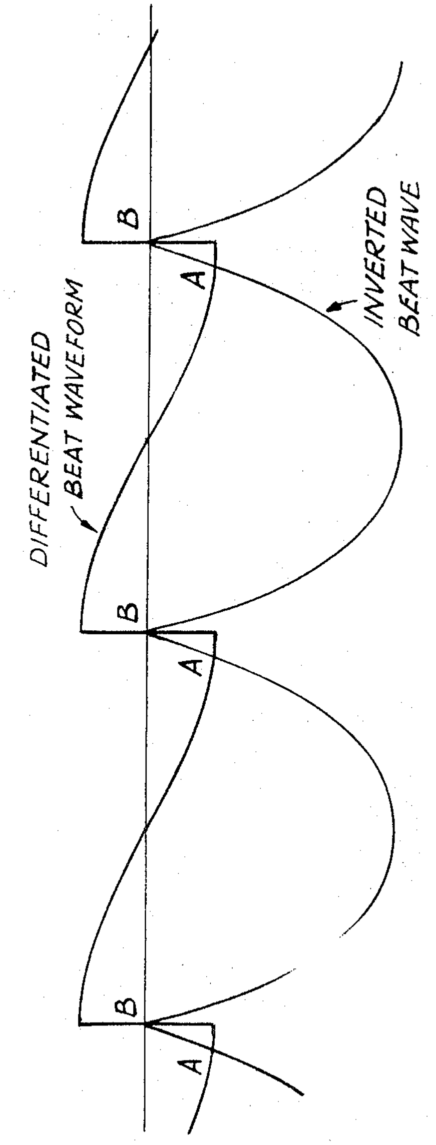
Figure 16:
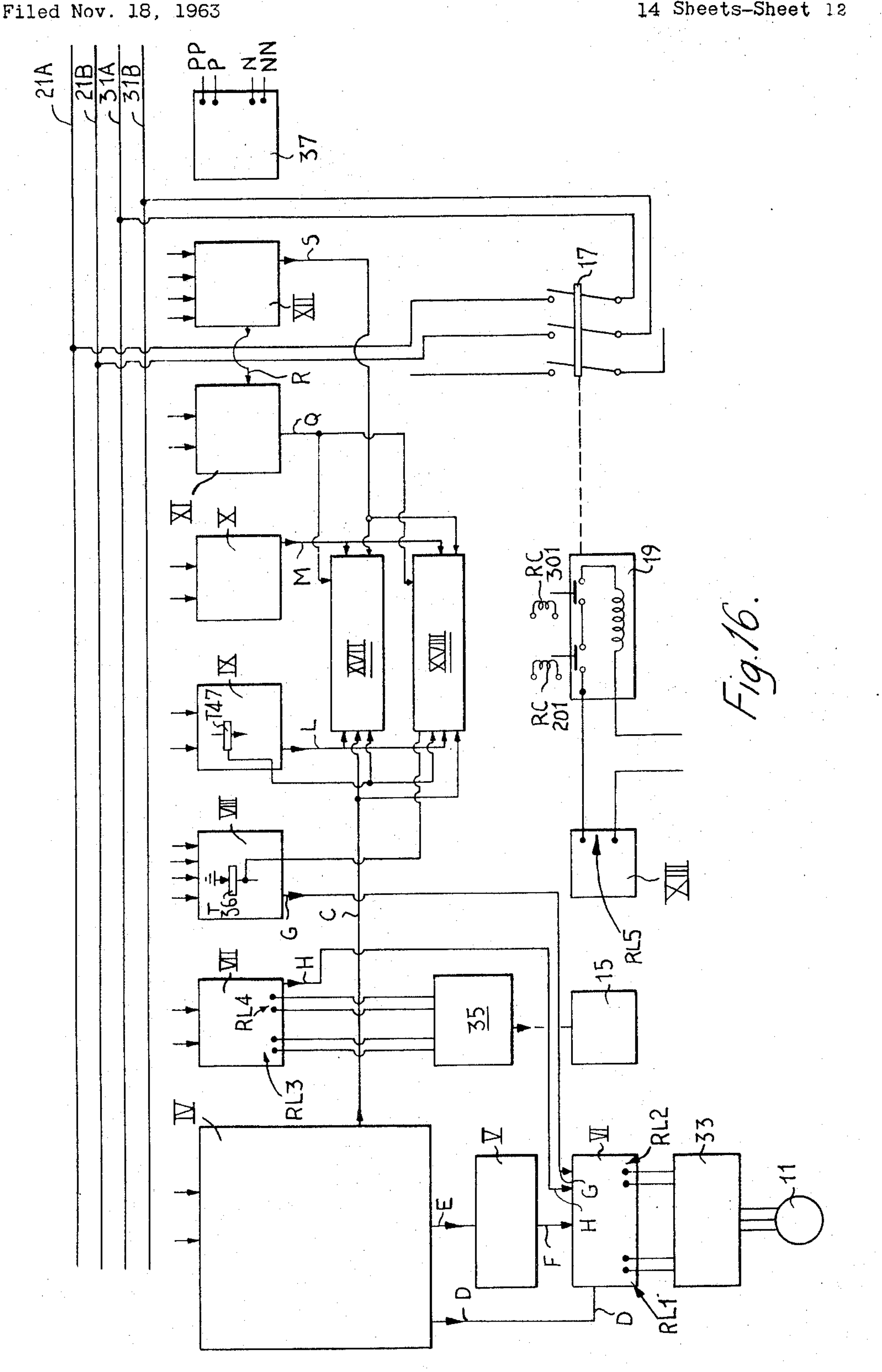
Figure 17:
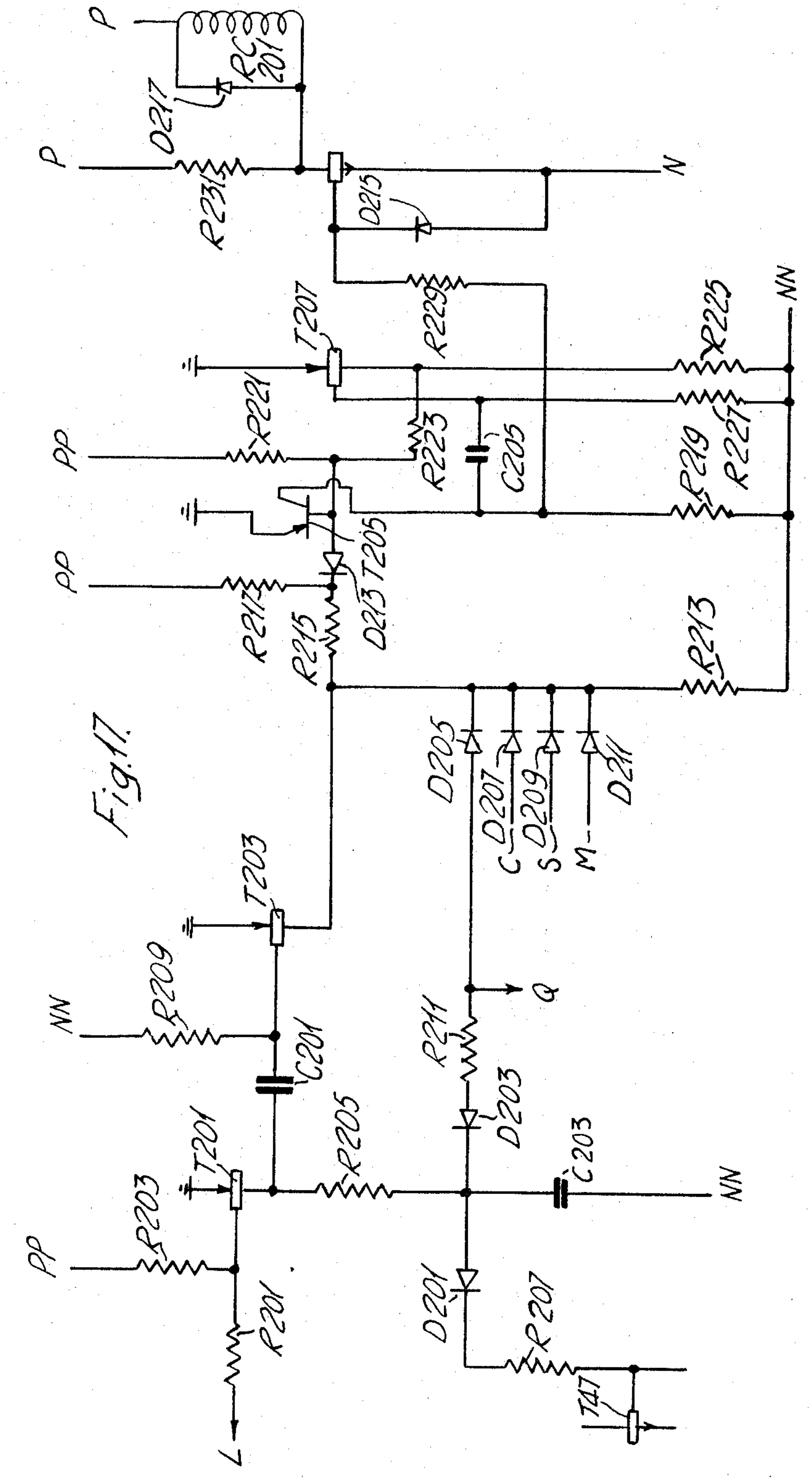
Figure 18:
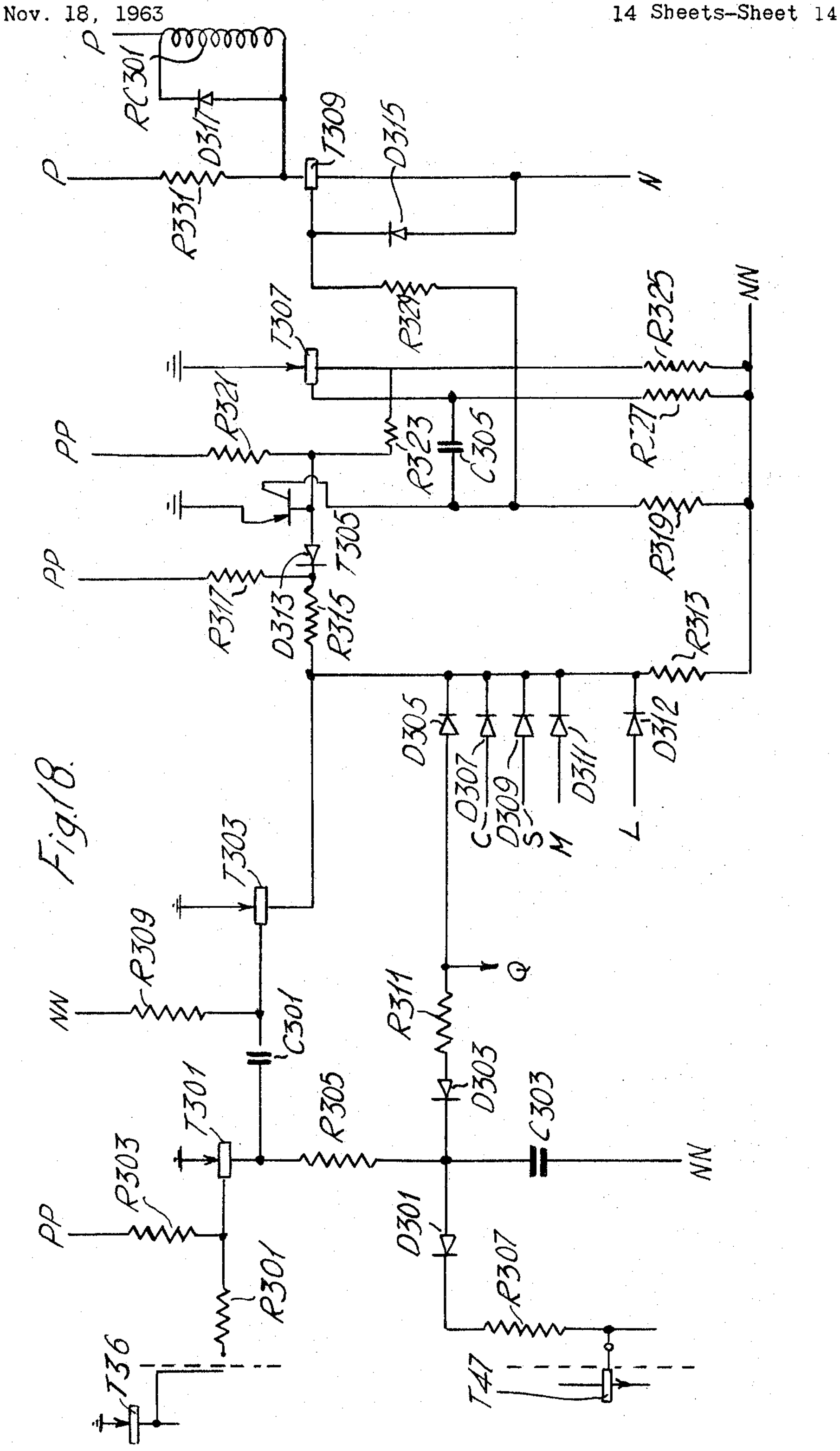

FIGURE 4 relates to a speed matching unit IV;
FIGURE 5 relates to a pulse unit V;
FIGURE 6 relates to a change-over unit VI;
FIGURE 7 relates to a voltage matching unit VII;
FIGURE 8 relates to a phase matching unit VIII;
FIGURE 9 relates to a phase checking unit IX;
FIGURE 10 relates to a voltage checking unit X;
FIGURE 11 relates to a slip-speed checking unit XI;
FIGURE 12 relates to an above-speed checking unit XII;

FIGURE 13 relates to a protective delay circuit XIII;

FIGURE 14 shows the waveforms at various points in the circuit of FIGURE 8;

FIGURE 15 is a diagram of the waveforms occurring at specified points in the phase checking unit IX shown in FIGURE 9;

FIGURE 16 is a block diagram, similar to FIGURE 2, and showing a modified control apparatus;

FIGURE 17 is the circuit diagram of an AND unit XVII shown in FIGURE 16;

FIGURE 18 is the circuit diagram of an AND unit XVIII shown in FIGURE 16; and

Figure 19:
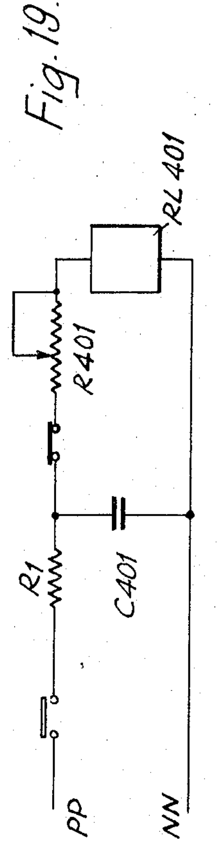

FIGURE 19 is a circuit diagram of an automatic load pick-up arrangement.

Figure 1:
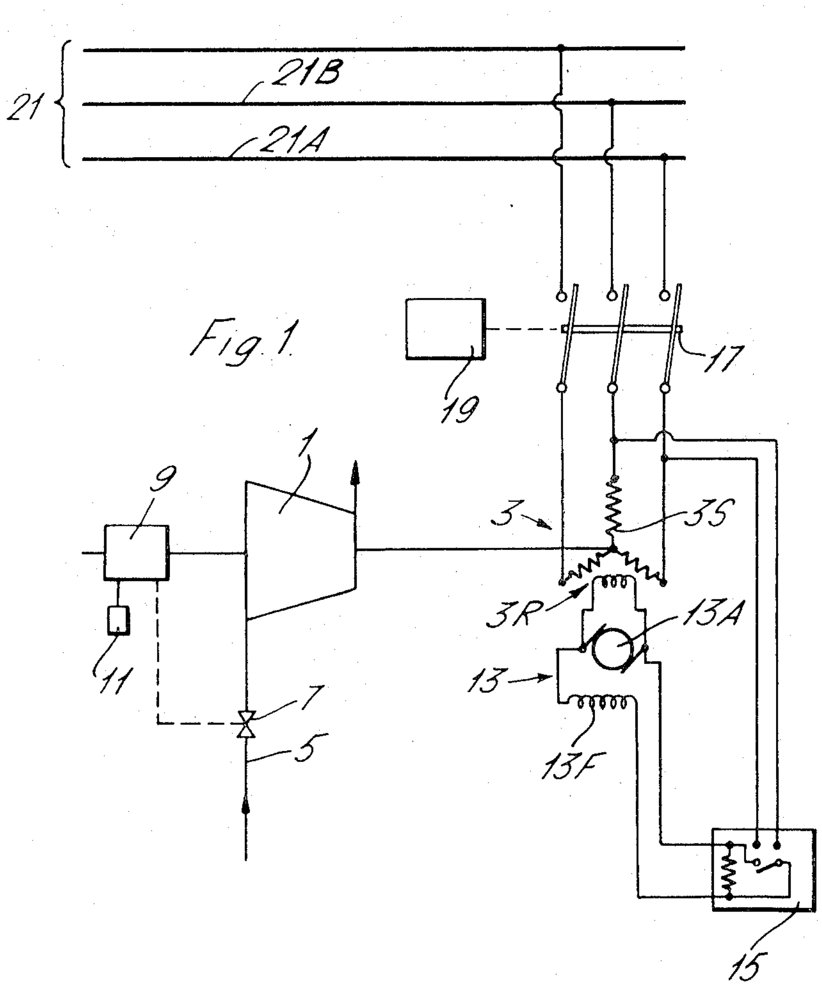
FIGURE 1 is a schematic representation of a three-phase turbo-generator and the attendant apparatus by which it is controlled and connected to a three-phase grid supply system.

Referring first to FIGURE 1, a steam turbine 1 is arranged to drive the rotor 3R of an alternator 3, the supply of steam through conduit 5 to the turbine being controlled by a regulating valve 7 actuated automatically by a centrifugal governor 9 driven by the turbine shaft. This governor is provided in the usual manner with a speeder motor 11, this being a small reversible electric motor that, by adjusting the tension in the regulating spring of the governor, adjusts the stable running speed of the turbine.

The alternator rotor 3R is excited by a D.C. exciter 13 mounted on the same shaft as the rotor and having an armature 13A and a shunt field winding 13F. Field winding 13F is in series with an automatic voltage regulator 15, suitably a voltage regulator of the Tirrill type, arranged to control the degree of excitation of the rotor 3R so as to maintain the phase terminal voltage of the alternator stator 3S substantially constant. A three-phase contact breaker 17 can be set to its closed position by a solenoid device 19, and when closed connects the alternator stator 3S to the three-phase grid system 21. It will be appreciated that it will often be necessary to add transformers between the alternator and the grid, that separate contact breakers may be used for the three phases, and that initially the connection will often be made to synchronizing bars in the power station rather than directly to the grid.

Referring now to FIGURE 2, this block diagram shows two conductors 21A and 21B of the three phase grid 21, the speeder motor 11, the contact breaker 17 and the contact breaker solenoid 19, all shown in FIGURE 1. It is necessary for the purposes of ensuring synchronizing before contact breakers 17 close, to apply a voltage indicative of the system of voltages on the grid 21 and a voltage indicative of the alternator terminal voltages, to several pieces of equipment, and the two voltages used are that between grid conductors 21A and 21B and that between the corresponding alternator output conductors 31A and 31B. The other items shown in FIGURE 2 comprise: A speed matching unit IV arranged to control through a pulse unit V, a change-over unit VI, and a motor controller 33, the speeder motor 11; a voltage matching unit VII arranged to control through a setting unit 35 the setting of the automatic voltage regulator 15; a phase matching unit VIII; a phase checking unit IX; a voltage checking unit X; a slip-speed checking unit XI; an above-speed checking unit XII; a protective delay circuit XIII; a power pack 37; and an AND gate 39. These items will now be described in detail with reference to the detailed circuit diagrams.

In order to facilitate an understanding of the interconnection of the various circuits, certain points in the system are indicated by letters, and it is to be understood that the points indicated by the same letters are connected together. Thus the power pack 37 provides a 12 volt positive output indicated by pole PP, a 6 volt positive output indicated by pole P, a 6 volt negative output indicated by pole N, and a 12 volt negative output indicated by pole NN. In all the figures, these letters indicate that the points denoted are connected to the relevant output pole of the power pack.

The speed matching unit IV (see FIGURE 4) includes a first transformer TR1 the primary P1 of which is energized from the conductors 31A and 31B and having two separate 10 volt secondaries S1 and S2. A second transformer TR2 has its primary P2 energized from the conductors 21A and 21B and has two separate 10 volt secondaries S3 and S4. Secondaries S1 and S3 are connected in series, the two outer ends being connected respectively through resistors R1 and R2 to opposite corners of a full wave diode bridge D1. Across these two corners is connected the series combination of a capacitor C1 and a resistor R3, the common point of which is connected to the common point of the secondaries S1 and S3. Secondaries S2 and S4 are connected in series, the two outer ends being connected respectively to opposite corners of a full wave diode bridge D2. The positive output corner of bridge D1 is connected to pole PP. The negative output corner of bridge D1 is connected through a resistor R4 to the pole PP and through a resistor R5 to the base of a pnp transistor T1. The collector of transistor T1 is connected in the forward direction through a diode D3 to the base of a pnp transistor T2 and through a resistor R6 to pole NN. The emitter of transistor T2 is earthed. The collector of this transistor is connected through a resistor R7 to pole NN and through a resistor R8 to the base of a pnp transistor T3. The base of transistor T2 is also connected through a resistor R9 to pole NN and through a capacitor C2 to the collector of transistor T3, which is also connected through a resistor R10 to pole NN, directly to the base of a pnp transistor T4, and through two series connected resistors R11 and R12 to the pole PP. The base of transistor T3 is connected through a resistor R13 to the pole PP. The collector of transistor T4 is connected to the pole NN. The emitter of transistor T4 is connected through two series connected resistors R14 and R15 to the pole P, and the common point of these two resistors is connected to the emitter of transistor T1. The common point of resistors R11 and R12 is connected to the base of a pnp transistor T5, the emitter of which is connected to the pole P. The collector of transistor T5 is connected through a resistor R16 to the pole NN, also firstly in a reverse direction through a diode D4 and then in a forward direction through a diode D5 to a point A, and secondly in a reverse direction through a diode D6 and then in a forward direction through a diode D7 to a point B. The common point of diodes D4 and D5 is connected through a resistor R17 to the pole PP and in a forward direction through a diode D8 to the base of a pnp transistor T6. The emitter of transistor T6 is connected to earth, and its collector is connected through a resistor R18 to pole NN and through a resistor R19 to the base of a pnp transistor T7. The base of transistor T6 is also connected through a resistor R20 to the pole PP and through a resistor R21 to the collector of transistor T7. The emitter of transistor T7 is earthed, and its collector is connected through a resistor R22 to the pole NN and through the series combination of resistors R23 and R24 to the pole PP. The base of transistor T7 is connected in the reverse direction through a diode D9 to the common point of diodes D6 and D7. The common point of resistors R23 and R24 is connected to the base of a pnp transistor T8, the emitter of which is earthed and the collector of which is connected through a resistor R25 to the pole NN. The collector of transistor T8 is connected in the forward direction through a diode D10 to point C and directly to point D.

The positive output corner of the diode bridge D2 is connected to the pole PP, and the negative output corner is connected through a resistor R26 to the pole PP and through a resistor R27 to the base of a pnp transistor T9. The collector of transistor T9 is connected through a resistor R28 to the pole NN, and in the forward direction through a diode D11 to the base of a pnp transistor T10. The emitter of transistor T10 is earthed, and its collector is connected through a resistor R29 to the pole NN and through a resistor R30 to the base of a pnp transistor T11. The emitter of transistor T11 is earthed, its base is also connected through a resistor R31 to the pole PP, and its collector is connected through a resistor R32 to the pole NN and directly to the base of a pnp transistor T12. The base of transistor T10 is connected through a resistor R33 to the pole NN and through a capacitor C3 to the collector of transistor T11. The emitter of transistor T12 is connected through the series combination of resistors R34 and R35 to the pole P, and the common point of these resistors is connected to the emitter of transistor T9. The collector of transistor T12 is connected to the pole NN. The collector of transistor T11 is also connected through a capacitor C4 to the base of a pnp transistor T13, which is also connected through a resistor R36 to the pole PP. The emitter of transistor T13 is connected to the pole P, and its collector is connected to the point A and through a resistor R37 to the pole NN. The collector of transistor T10 is also connected through a capacitor C5 to the base of a pnp transistor T14, which is also connected through a resistor R38 to the pole PP. The emitter of transistor T14 is connected directly to the pole P, and its collector is connected to point B and through a resistor R39 to the pole NN. This collector is also connected to a point E.

FIGURE 5 shows the pulse unit V, which includes an npn transistor T15 the base of which is connected through a resistor R40 to the point E in FIGURE 4. The emitter of transistor T15 is connected to the pole N, and its collector is connected through a resistor R41 to the pole PP and also in series through a resistor R42, in the reverse direction through a diode D12, in the forward direction through a diode D13, to the base of an npn transistor T16. The common point of diodes D12 and D13 is connected through two series connected resistors R43 and R44 to the pole PP, and through a capacitor C6 to the pole NN. The emitter of transistor T16 is connected to the pole P, and its collector is connected through a resistor R45 to the pole PP and directly to the base of an npn transistor T17. The collector of transistor T17 is connected to the pole P, and its emitter is connected through the series combination of resistors R46 and R47 to earth. The common point of resistor R46 and R47 is connected ot the base of a pnp transistor T18, the emitter of which is connected to the pole P and the collector of which is connected through a resistor R48 to the pole NN and is connected directly to a point F.

FIGURE 6 shows the change-over unit VI, which includes a pnp transistor T19 the base of which is connected through a capacitor C7 to a point G and through a resistor R49 to the pole N. The collector of transistor T19 is connected directly to the pole N, and its emitter is connected through a resistor R50 to the pole P and through a resistor R51 to the base of a pnp transistor T20. The emitter of transistor T20 is connected to the emitter of an npn transistor T21, and its collector is connected through a resistor R52 to the pole NN. The collector of transistor T21 is connected to the pole P, and its emitter is also connected through a resistor R53 to the pole NN. The base of transistor T21 is connected through a resistor R54 to the pole P, and in the forward direction through a diode D14 to the common point of two series connected resistors R55 and R56, the others ends of which are connected respectively to the poles NN and PP.

The collector of transistor T20 is connected in the forward direction through a diode D15 and a resistor R57 to the pole NN, the common point of the diode and the resistor being connected first in the reverse direction through a diode D16 to the point D and secondly through a resistor R58 to the base of an npn transistor T22. The emitter of transistor T22 is connected to the pole N, and its collector is connected firstly through the operating coil of a relay RL1 and secondly in a forward direction through a diode D16 to the pole PP. This collector is also connected through a resistor R59 to the base of a pnp transistor T23, the emitter of which is connected to the pole P and the collector of which is connected through a resistor R60 to the pole NN. This collector is also connected in a reverse direction through a diode D17 to the base of transistor T21 and in forward direction through a diode D18 to the base of pnp transistor T24, the emitter of which is earthed. The base of transistor T24 is also connected in a reverse direction through a diode D19 to point F (see FIGURE 5), in a reverse direction through a diode D20 to a point H, and through a resistor R61 to the pole N. The collector of transistor T24 is connected firstly through the operating coil of a relay RL2 and secondly in a reverse direction through a diode D21 to the pole NN.

FIGURE 7 shows the voltage matching unit VII, and this includes a transformer TR3 having a primary P3 energized from the conductors 21A and 21B and a 20 volts secondary S5 connected across one pair of opposite corners of a full wave diode bridge D22. The positive output corner of the bridge D22 is connected to the pole P and the negative output corner is connected to the base of a pnp transistor T25, and firstly through a capacitor C8 and secondly through a resistor R62 to the pole P. The collector of transistor T25 is connected to the pole NN, and its emitter is connected through a resistor R63 to the pole PP and through a resistor R64 to the base of an npn transistor T26. The collector of transistor T26 is connected through a resistor R65 to the pole PP and through a resistor R66 to the base of a pnp transistor T27 the emitter of which is earthed. The collector of transistor T27 is connected firstly in a reverse direction through a diode D23 and secondly through the operating coil of a relay RL3 to the pole NN. This collector is also connected in a forward direction through a diode D24 and through a resistor R67 to the base of an npn transistor T28, the common point of diode D24 and resistor R67 being connected through a resistor R68 to the pole NN. The emitter of transistor T28 is connected to the pole N, and its collector is connected through a resistor R69 to the pole PP and through a resistor R70 to the base of a pnp transistor T29, the emitter of which is connected to the pole P and the collector of which is connected through a resistor R71 to the pole N and to a point J.

The circuit of FIGURE 7 also includes a transformer TR4 having a primary P4 energized from the conductors 31A and 31B and a 20 volts secondary S6 connected across one pair of opposite corners of a full wave diode bridge D25. The positive output corner of bridge D25 is connected to the pole P, and the negative output corner is connected firstly through a capacitor C9 and secondly through a resistor R72 to the pole P, and also to the base of a pnp transistor T30. The collector of transistor T30 is connected to the pole NN and its emitter is connected through a resistor R73 to the pole P, and through a resistor R74 to the base of an npn transistor T31. The emitter of transistor T30 is also connected through a resistor R75 to the emitter of transistor T26. The emitter of transistor T31 is connected through a resistor R76 to the emitter of transistor T25. The collector of transistor T31 is connected through a resistor R77 to the pole PP and through a resistor R78 to the base of a pnp transistor T32, the emitter of which is earthed and the collector of which is connected firstly in a reverse direction through a diode D26 and secondly through the operating coil of a relay RL4 to the pole NN, and also in a forward direction through a diode D27 to the junction of diode D24 and resistor R67.

Referring now to FIGURE 8, the phase matching unit VIII includes a transformer TR5 having a primary P5 energized from the conductors 21A and 21B and a 10 volt secondary S7, one end of which is connected to the pole N and the other end of which is connected through a resistor R79 to the base of an npn transistor T33. The emitter of this transistor is connected to the pole N and in a forward direction through a diode D28 to the transistor base. The collector of this transistor is connected through a resistor R80 to the pole PP and through a resistor R81 shunted by a capacitor C10 to the base of a pnp transistor T34. The emitter of transistor T34 is connected to the pole P and in a reverse direction through a diode D29 to the transistor base, and its collector is connected through a resistor R82 to the pole NN and through a capacitor C11 to the base of a pnp transistor T35. The emitter of transistor T35 is connected to the pole PP, and is collector is connected in a reverse direction through a diode D30 to earth, through a resistor R83 to the pole NN and through a capacitor C12 to the base of a pnp transistor T36. The emitter of transistor T36 is earthed, its base is also connected through a resistor R84 to the pole NN, and its collector through a resistor R85 to the pole NN. A further npn transistor T37 has its base connected to the pole N, its emitter connected through a resistor R86 to the pole NN, and its collector connected to the base of transistor T35.

The circuit of FIGURE 8 also includes a transformer TR6 having its primary P6 energized from the conductors 21A and 21B and a 10 volt secondary S8. It also includes a transformer TR7 having its primary P7 energized from the conductors 31A and 31B and having a 10 volt secondary S9. Secondaries S8 and S9 are connected in series across one pair of opposite corners of a diode bridge D30, the negative output corner of which is connected to the pole P and the positive output corner of which is connected through a smoothing choke CH1 to the point G. The two ends of choke CH1 are connected respectively by capacitors C13 and C14 to the pole P. Point G is connected through the series combination of capacitors C15 and C16 and potentiometer R87 to pole P, and also through resistor R88 to that pole. The junction of capacitors C15 and C16 is connected to pole P by resistor R89. Capacitor C16 is shunted by a resistor R90, and potentiometer R87 is shunted by a resistor R91. The slider of the potentiometer R87 is connected to the base of an npn transistor T38, the collector of which is connected to the pole PP and the emitter of which is connected firstly through a resistor R92 to the pole NN and secondly to the collector of transistor T34.

The circuit of FIGURE 8 also includes a transformer TR8 having its primary P8 energized from the conductors 31A and 31B and having a 10 volt secondary S10. One end of secondary S10 is connected to the pole PP, and the other end is connected through a resistor R93 to the base of a pnp transistor T39. The emitter of transistor T39 is connected to the pole PP and in a reverse direction through a diode D31 to the transistor base, while its collector is connected firstly through a resistor R94 to the pole NN, secondly in a reverse direction through a diode D32 to the pole N, and thirdly through a capacitor C17 to the base of a pnp transistor T40. The emitter of transistor T40 is connected to the pole PP, its base is also connected through two parallel connected resistors R95 and R96 to the pole NN, and its collector is connected firstly in a reverse direction through a diode D33 to earth, secondly through a resistor R97 to the pole NN, and thirdly through a capacitor C18 to the base of a pnp transistor T41. The emitter of transistor T41 is earthed, its base is also connected through a resistor R98 to pole NN and its collector is connected firstly through a resistor R99 to pole NN, secondly to the collector of transistor T36 and thirdly through the series combination of resistors R100 and R101 to the pole PP. The junction of resistors R100 and R101 is connected in a reverse direction through a diode D34 to the base of a pnp transistor T42. The emitter of transistor T42 is earthed, and its collector is connected through a resistor R102 to the pole NN and through a capacitor C19 to the base of a pnp transistor T43. The base of transistor T42 is connected through a resistor R103 to the pole PP. The emitter of transistor T43 is earthed, its base is connected through a resistor R104 to the pole NN, and its collector is connected through a resistor R105 to the base of transistor T42, through a resistor R106 to the pole NN, and to a point K.

The phase checking unit IX shown in FIGURE 9 includes a transformer TR9 having a primary P9 energized from the conductors 31A and 31B and two 10 volt secondaries S11 and S12. It also includes a transformer TR10 having a primary winding P10 energized from the conductors 31A and 31B and two 10 volt secondaries S13 and S14. Secondaries S11 and S13 are connected in series and their outer ends are connected respectively to a first input corner of a diode rectifier bridge D35 and to a first input corner of a diode rectifier bridge D36. Secondaries S12 and S14 are connected in series and their outer ends are connected respectively to a second input corner of bridge D35 and to a second input corner of bridge D36. The negative pole of bridge D35 is connected to the pole P, and its positive pole is connected through the series combination of a choke CH2, a capacitor C20 and a potentiometer R107 to the pole P. The two sides of the choke are connected to pole P respectively through capacitors C21 and C22. Capacitor C22 is shunted by a resistor R108. The slider of potentiometer R107 is connected to the base of an npn transistor T44, the collector of which is connected to the pole PP and the emitter of which is connected through a resistor R109 to earth. The emitter of transistor T44 is also connected to the emitter of a pnp transistor T45 and through a resistor R110 to the base of a pnp transistor T46. The collector of transistor T45 is connected to a point L and. through a resistor R111, to the pole NN. The base of transistor T45 is connected through a resistor R112 firstly in a forward direction through a diode D37 to the emitter of transistor T46 and secondly to the emitter of an npn transistor T47. The collector of transistor T46 is connected to the point L. The collector of transistor T47 is connected to the pole PP, its emitter is connected through a resistor R113 to earth, and its base is connected through a choke CH3 to the negative output corner of the bridge D36. The side of choke CH3 nearer the bridge D36 is connected through a capacitor C23 to the positive output corner of the bridge and to the pole P, while the other side of the choke is connected by the parallel combination of a capacitor C24 and a resistor R114 to the pole P.

Referring now to FIGURE 10, the voltage checking unit X includes a transformer TR11 having a primary P11 energized from the conductors 21A and 21B and having a 20 volt secondary S15. It also includes a transformer TR12 having a primary P12 energized from the conductors 31A and 31B and a 20 volt secondary S16. Secondary S15 is connected accross one pair of opposite corners of a diode bridge D38 and secondary S16 is connected across one pair of opposite corners of a diode bridge D39. The positive output corner of bridge D38 is connected to the positive output corner of bridge D39. The negative output corner of bridge D38 is connected to the base of a pnp transistor T48, the collector of which is connected to the pole NN and the emitter of which is connected through a resistor R115 to the pole PP. The base of transistor T48 is connected through the parallel combination of a capacitor C25 and a resistor R116 to the pole P. The emitter of transistor T48 is connected through a resistor R117 to the base of an npn transistor T49, the collector of which is connected through a resistor R118 to the pole PP and through a resistor R119 to the base of a pnp transistor T50, the emitter of which is earthed. The collector of transistor T50 is connected to a point M and through a resistor R120 to the pole NN.

The negative pole of the bridge D39 is connected to the base of a pnp transistor T51 and through the parallel combination of a capacitor C26 and a resistor R121 to the pole P. The collector of transistor T51 is connected to the pole NN and its emitter is connected through a resistor R122 to the pole P and through a resistor R123 to the base of an npn transistor T52. The emitter of transistor T48 is connected to the emitter of transistor T52 through a resistor R124, the collector of transistor T49 is connected to the collector of transistor T52, and the emitter of transistor T49 is connected through a resistor R125 to the emitter of transistor T51.

The slip-speed checking unit XI shown in FIGURE 11 includes a transformer TR13 having a primary P13 energized from the conductors 21A and 21B and a 10 volts secondary S17. It also includes a transformer TR14 having a primary P14 energized from the conductors 31A and 31B and a 10 volt secondary S18. The two secondaries S17 and S18 are connected in series and their outer ends are connected to one pair of opposite corners of a diode bridge D40. Connected across the output corners of the bridge is a voltage divider consisting of two series connected resistors R126 and R127 and shunted by a capacitor C27. The common point of these two resistors is connected to the base of an npn transistor T53, the collector of which is connected to the pole PP and the emitter of which is connected through a resistor R128 to the pole NN. This emitter is also connected to the emitter of a pnp transistor T54, the collector of which is connected to a point Q and, through a resistor R129, to the pole NN. The base of transistor T54 is connected through a resistor R130 to the emitter of a pnp transistor T55, the collector of which is connected to the pole NN and the emitter of which is also connected through a resistor R131 to the pole PP. The base of transistor T55 is connected through a resistor R132 to the pole P and the negative output corner of the bridge D40, and this base is also connected through a capacitor C28 to a point R.

The above-speed checking unit XII shown in FIGURE 12 includes a transformer TR15 having a primary P15 energized from the conductors 31A and 31B and a 20 volt secondary S19. A further transformer TR16 has a primary P16 energized from the conductors 21A and 21B and a 20 volt secondary S20. The two secondaries are connected in series, the outer end of secondary S19 is connected through a capacitor C28 to one input corner of a diode bridge D41, and the outer end of secondary S20 is connected through a resistor R133 to the opposite corner of the bridge. Between capacitor C28 and resistor R133 is connected the series combination of a resistor R134 and a capacitor C29, the common point of which is connected to the joined ends of the two secondaries. The positive output corner of bridge D41 is connected to the pole N, and its negative output corner is connected through the series combination of an inductance L1, a capacitor C30 and a resistor R135 to the base of a pnp transistor T56. The two ends of the inductance L1 are connected to the pole N respectively through capacitors C31 and C32, capacitor C32 being shunted by a resistor R136. The junction of capacitor C30 and resistor R135 is connected through a resistor R137 to the pole PP, and the base of the transistor is connected in a forward direction through a diode D42 to pole PP. The emitter of the transistor is connected to the pole PP, and its collector is connected through a resistor R138 to the pole NN.

A transformer TR17 has a primary P17 energized from the conductors 31A and 31B and a 10 volt secondary S21. A transformer TR18 has a primary P18 energized from the conductors 21A and 21B and a 10 volt secondary S22. The secondaries are connected in series across the two opposite input corners of a diode bridge D43. The negative output corner of the bridge is connected to the pole N, and the positive output corner is connected through the series combination of an inductance L2, a capacitor C33, and a resistor R139 to the base of a pnp transistor T57. The two ends of the inductance L2 are connected to the pole N respectively through capacitors C34 and C35, capacitor C35 being shunted by a resistor R149. The junction of inductance L2 and capacitor C33 is connected to point R. The junction of capacitor C33 and resistor R139 is connected by a resistor R141 to the pole PP. The base of the transistor is connected in a forward direction through a diode D44 to the pole PP, its emitter is connected directly to pole PP, and its collector is connected through a resistor R142 to the pole NN.

The point R is connected to the base of a pnp transistor T58, the collector of which is connected to the pole NN and the emitter of which is connected firstly through a resistor R143 to the pole PP and secondly through a resistor R144 to the base of a pnp transistor 159. The emitter of transistor T59 is earthed, its base is connected in a forward direction through a diode D45 to the pole PP, and its collector is connected firstly through a resistor R145 to the pole NN, and secondly through a resistor R146 and then in a reverse direction through a diode D46 to the base of a pnp transistor T60. The emitter of transistor T60 is earthed and its base is connected firstly through a resistor R147 to the pole PP, secondly in a forward direction through a diode D47 to the collector of the transistor T56, and thirdly in a forward direction through a diode D48 to the collector of transistor T57. The collector of transistor T60 is connected to a point S and through a resistor R148 to the pole NN.

The protective delay circuit XIII shown in FIGURE 13 includes the series combination of a capacitor C36 and a resistor R149 connected across the poles PP and NN. Their junction point is connected in a reverse direction through a diode D49 to the base of a pnp transistor T61, the emitter of which is connected to the common point of two series connected resistors R150 and R152 which are connected between the poles PP and NN. The collector of transistor T61 is connected through a resistor R161 to the pole NN, and directly to the base of an npn transistor T62, the collector of which is connected to the pole PP. The emitter of transistor T62 is connected in a reverse direction through a diode D50 to the pole NN and also through the operating coil of a relay RL5 to pole NN.

In use of the apparatus described above, with the contact breakers 17 open the turbine 1 and alternator 3 will be run up to full speed in accordance with normal operating procedure. This will bring the alternator to within say eight percent of its proper speed for synchronizing. The automatic synchronizing apparatus is then switched on, and before the end of a short delay caused by the protective delay circuit XIII (see FIGURE 2) the various components of the apparatus are fully energized and start to effect synchronizing of the alternator to the grid.

The first step is to ensure that the alternator is running slightly too fast, and speed matching unit IV acting through the connection marked "D," the change-over unit VI, the motor controller 33 and the speeder motor 11 progressively adjusts the setting of governor 9 until the alternator is running about one percent too fast.

The next step (which will start before the first step is completed) is for the voltage matching unit VII to reduce the voltage difference across the circuit breakers 17 to less than a prescribed percentage of the grid voltage, and this step unit VII effects through the relays RL3 and RL4, which through the setting unit 35 adjust the setting of the automatic voltage regulator 15. Once the voltage difference has been reduced to within the prescribed limits, the speed matching unit IV applies pulses through the connection denoted by "E" to the pulse unit V to cause closing of the relay RL2 for a short period each time a beat occurs between the alternator voltage and the grid voltage, this effecting through the speeder motor 11 a small reduction in the turbine speed. When the alternator speed is within the permissible limits for synchronizing, speed matching unit IV through the connection marked "C" provides a "go" signal on the "C" input to the gate 39. When the phase difference between the alternator voltage and the grid voltage is such that, allowing for the operating delay in the equipment, it is proper to initiate closing of the circuit breakers 17, then phase matching unit VIII through the connection marked "K" provides a "go" signal on the "K" input to the gate 39.

At this time the solenoid 19 of the circuit breakers is energized as long as RL5 of the protective delay circuit XIII has closed and as long as all of the check units IX to XII are providing, respectively through the connections "L," "M," "Q," and "S," "go" signals to the AND gate 39.

The operation of the equipment will now be described in detail mainly with reference to the circuit diagrams of FIGURES 4 to 9.

When the synchronizing apparatus is switched on, there are two possible states: the alternator may be running at a speed between that corresponding to the actual grid frequency and that corresponding to the lowest possible setting of the governor 9 by the speeder motor 11; or the alternator may be running at a speed between that corresponding to the actual grid frequency and that corresponding to the highest possible setting of the governor 9 by the speeder motor 11. In the first case (alternator speed low), the speed matching unit IV causes the speeder motor 11 to run continuously so that the speed of the alternator is increased at a rate of approximately 12 r.p.m. per second until the alternator speed has risen to a point where it is running at about 1 percent above the speed corresponding to the grid frequency. Thereafter the speeder motor ceases to accelerate the turbine but is pulsed to reduce the alternator speed slowly towards that corresponding to the grid frequency. In the second case (alternator speed too high), the speeder motor is pulsed to reduce the turbine speed towards that corresponding to the grid frequency.

To operate in this manner, the speed matching unit must determine whether the generated frequency is greater or lower than the grid frequency, and also whether the percentage slip speed is greater or less than a prescribed value.

Figure 3:
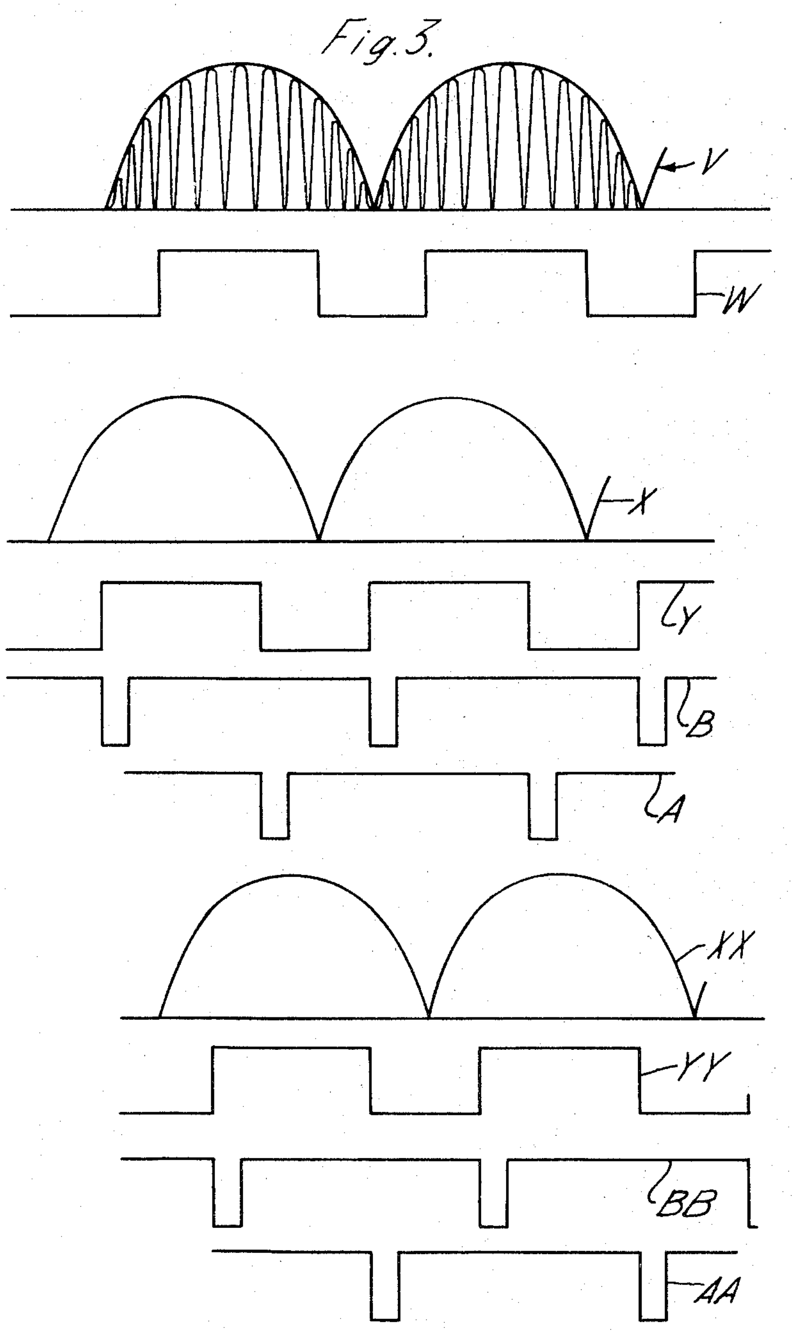
FIGURE 3 is a diagram of the waveforms occurring at specified points in the control apparatus shown in FIGURE 2.

In the circuit of FIGURE 4, the two transformers TR1 and TR2 have their secondaries S1 and S2, so connected that their E.M.F.'s, are subtracted from one another, and have their secondaries S3 and S4 similarly connected so that two unfiltered beat waveforms are produced (when the alternator and the grid are out of synchronism), one of the waveforms being phase shifted by the lag circuit comprising resistor R1 and capacitor C1. The phase lag is 45 degrees. The waveform of the phase-shifted beat, at point V, the base of transistor T1, is shown in FIGURE 3 as curve V. Transistors T1 to T4 serve to square the shape of the beat waveform about a set voltage level to produce the waveform shown as curve W in FIGURE 3. When the beat amplitude is less than the set voltage, the transistor T1 is non-conducting and when the beat amplitude exceeds the set voltage rectangular pulses at 10 millisecond intervals occur at the collector of the transistor. These pulses are used to trigger a mono-stable multivibrator circuit comprising transistors T2 and T3. The recovery time of the multivibrator is approximately 20 milliseconds. Hence, once this multivibrator circuit is triggered, recovery to the stable state is prevented by further triggering pulses every 10 milliseconds set up in transistor T1 by the feed-back transistor T4. When the amplitude of the beat waveform input to transistor T1 falls below the set voltage, the mono-stable circuit recovers to its stable state at its own inherent rate, and the square waveform terminates.

Thus the mono-stable circuit comprising transistors T2 and T3 changes its state when the beat amplitude rises above, and when it falls below, a set voltage level. Consequently, as long as the amplitude of the grid and alternator voltages are constant, so giving rise to a beat waveform of constant amplitude, this change of state occurs at a fixed phase angle on the beat waveform, indepedent of the beat frequency. The square waveform is fed to a transistor invertor consisting of transistor T5 which provides sufficient power for driving subsequent gating circuits.

When the alternator is running too slow, the waveform produced by the opposed secondaries S3 and S4 will be as shown at X in FIGURE 3. Transistors T9, T10, T11 and T12 produce a square wave from the non-phase-shifted beat waveform and function in a manner similar to that of transistors T1, T2, T3 and T4 to produce at point Y, the collector of transistor T11, the waveform denoted by Y in FIGURE 3. The collectors of the two transistors T10 and T11 are connected respectively to the two transistors T13 and T14 through CR circuits which produce narrow spikes when the monostable circuit of transistors T10 and T11 changes state. These spikes are amplified and squared by the transistors T13 and T14 respectively and produce at the points A and B respectively the waveforms shown in FIGURE 3 as curves A and B respectively. It will be seen that transistor T13 produces a positive pulse just before the beat amplitude falls to zero whereas transistor T14 produces a similar pulse just after the zero.

Diodes D4 and D5 form an AND gate at the input to transistor T6, and diodes D6 and D7 form an AND gate at the input to transistor T7. The two inputs to the AND gate of transistor T6 are the waveform W and the waveform A, while the two inputs to the AND gate of transistor T7 are the waveform W and the waveform B. Transistors T6 and T7 together for a bistable circuit which is triggered into one state by simultaneous positive pulses through diodes D4 and D5 and to its alternative state by simultaneous positive pulses through diodes D6 and D7. Thus, when the alternator is running too slowly, the AND gate of transistor T6 receives simultaneous pulses from waveforms W and A so that this transistor is triggered, while the AND gate of transistor T7 receives no simultaneous pulses from the waveforms W and B so that this transistor is never triggered. The bistable circuit thus assumes and remains in a first of its stable states.

On the other hand, if the alternator is running too quickly, the waveforms X, Y, B and A move, relative to the waveforms V and W, to the positions indicated by curves XX, YY, BB and AA in FIGURE 3. It will be seen that now the AND gate of transistor T7 receives simultaneous pulses from waveforms W and B while the transistor T6 receives no simultaneous pulses from waveforms W and A, so that this transistor is never triggered. The bistable circuit thus assumes and remains in the second of its two stable states. Thus the state of this bistable circuit indicates if the alternator speed is too high and indicates if the alternator speed is too low. The output from one side of the bistable circuit is fed into a waveform squaring circuit including transistor T8, which provides an output signal at a sufficiently high power level to drive subsequent parts of the synchronizing apparatus.

As described above, the speed of the turbo-alternator is adjusted by driving the speeder motor 11 in the appropriate direction. The point D on the speed matching unit (see FIGURE 4) is connected to the point D on the changeover unit (see FIGURE 6), and if the output from the speed matching unit signifies a low alternator speed, the signal on point D causes the transistor T22 to conduct to energize the relay RL1 and cause the speeder motor 11 to adjust the turbine governor 9 to produce the desired increase in alternator speed up to a one percent excess speed.

If the alternator speed is too high, the pulse unit V applies to the speeder motor a short pulse driving it in the alternator-slowing direction, each time a beat occurs between the voltage on the alternator with the voltage on the grid. Thus each beat period a pulse appears at the point E in FIGURE 4, and is applied to the point E in FIGURE 5. Transistor T15 conducts for a short time each beat period. During the time when T15 is conducting, capacitor C6 discharges down to −6 volts, so that transistors T16 and T18 cease conducting. After the voltage at the base of transistor T15 has fallen below −6 volts, capacitor C6 charges up towards +12 volts through resistors R43 and R44. When its voltage increases above +6 volts, transistors T16 and T18 conduct. Therefore resistors R43 and R44 define the pulse length. Transistor T17 operates as an impedance buffer stage and as a level change. The output pulses at point F of FIGURE 5 are applied to point F of the change-over unit, FIGURE 6. In that circuit, a pulse applied to the point F renders the diode D19 non-conducting, the transistor T24 then conducts and the relay RL2 is energized and energizes the speeder motor 11 to reduce the speed setting of the governor 9. As will be explained below, this lowering of the governor setting can take place only after the completion of the voltage matching between the alternator and the grid.

The function of the voltage matching unit VII (see FIGURE 7) is to reduce the voltage difference across the circuit breakers 17 to less than a prescribed percentage of the grid voltage. The percentage setting is adjustable to 2%, 4% or 6% of the grid voltage, as desired. The alternator voltage is rectified in the diode bridge D25, is smoothed and is applied to the emitter follower transistor T30. The grid voltage is similarly rectified in bridge D22, is smoothed and applied to the emitter follower transistor T25. The emitters of transistors T25 and T30 are connected respectively to the bases of transistors T26 and T31, and to the emitters of transistors T31 and T26 respectively. As a result, if the alternator voltage is greater than the grid voltage by more than a certain amount, the collector current turned on in transistor T31 is sufficient to raise the collector voltage above "earth" level, so causing transistor T32 to conduct to energize the relay RL4. When energized, relay RL4 causes the voltage setting of the automatic voltage regulator 15 to be lowered. On the other hand, if the grid voltage is greater than the alternator voltage by more than a certain amount, the collector current turned on in transistor T26 will raise its collector voltage above earth level, so causing transistor T27 to conduct to energize the relay RL3, which causes the voltage setting of the regulator 15 to be raised. The percentage setting of the voltage matching unit is altered by changing the value of the resistors R75 and R76.

The function of the phase matching unit VIII (see FIGURE 8) is to effect the closure of the circuit breakers 17 only when the phase difference between alternator and grid voltages is no greater than five degrees at the instant of closure. It is necessary to allow for the predictable time delay in the operation of the contact breakers. This is done by deriving from the vector representing the grid voltage a vector representing a delayed voltage, the magnitude of the delay being proportional to the slip speed between the vector representing the grid voltage and the vector representing the alternator voltage. The result of this is that when the alternator speed is too high, so that the vector representing the alternator voltage is repeatedly overtaking the vector representing the grid voltage, the vector representing the alternator voltage will coincide with the vector representing the delayed voltage at a time interval before its coincidence with the vector representing the grid voltage, the time interval being a constant quantity.

The voltage in the secondary S7 is derived from the grid voltage and has the waveform shown in the curve S7V in FIGURE 14. This waveform is squared by the arrangement of transistors T33 and T34 to produce the waveform shown as curve T34V. The desired time delay is introduced by applying this waveform to the capacitor C11, so that the voltage on one of its plates is rapidly changed and electrical charge then removed from the plate at a substantially constant rate through the transistor T37. The resulting triangular waveform produced at the collector of transistor T37 is shown by the curve T37V. This triangular waveform is squared and inverted by transistor T35 and is shown by curve T35V. The positive-going edge of this square wave is differentiated by capacitor C12 and resistor R84 and the resulting spike (see curve T36BV) fed into the base of transistor T36. Thus a narrow pulse (see curve T36CV) is produced on the collector of transistor T36, and this pulse is delayed from the positive going edge of the squared grid waveform (curve T34V) by the constant current discharge of capacitor C11.

By altering the amplitude of the squared grid waveform (curve T34V), by changing the catching voltage on transistor T34, the magnitude of the sudden change in voltage applied to capacitor C11 can be varied. As the discharge rate is held constant by transistor T37, the phase delay can thus be varied. The catching voltage is varied in accordance with the slip frequency between the alternator and grid voltages. Thus the two voltages are subtracted by means of the transformers TR6 and TR7, the resulting waveform is full-wave rectified in bridge D30 and is filtered to give a beat waveform the magnitude of which is zero when incoming and running voltages are in phase and reaches a maximum when they are 180 degrees out of phase. The beat waveform is fed into a shaping circuit (between choke CH1 and transistor T38) to give a voltage which increases in amplitude with an increase in the beat frequency. This voltage is fed into the emitter follower circuit of transistor T38 and the output applied to the collector of transistor T34 so that the amplitude of the squared grid waveform is varied with the slip-speed of the alternator. Consequently, the phase delay of the grid pulse train is varied with the slip-speed in the manner required.

The waveform from the alternator, provided by secondary S10 of transformer TR8 is treated in a manner similar to that used on the output from secondary S7, except that the time delay produced is small and is not adjustable. The grid pulse train and the pulse train derived from secondary S10 are both fed into a transistor AND gate formed by transistor T41, which gives an output only if pulses exist in the alternator and grid pulse trains at the same instant. This output is arranged to trigger a mono-stable circuit formed by transistors T42 and T43. This circuit, on being triggered, switches to an unstable state, and produces an output pulse which is applied through point K to the AND gate which controls the closing of the circuit breakers.

Certain outputs from the speed matching unit IV, the pulse unit V, the voltage matching unit VII and the phase matching unit VIII are applied to the change-over unit VI. Thus an output from point G on the phase matching unit VIII is fed through point G in the change-over unit (see FIGURE 6) to a differentiator formed by capacitor C7 and resistor R49 so that the voltage appearing at the emitter of transistor T19 is proportional to the generator slip-speed. The emitter follower transistor T21 provides a variable reference voltage in conjunction with the potential divider formed by resistors R55 and R56, so that transistor T20 will stop conducting only when the magnitude of the differential beat waveform is greater than the set reference level. The collector of transistor T20 is connected to diode D15 of an AND gate comprising diodes D15 and D16. When the alternator is running at a speed higher than that corresponding to the grid frequency, the diode D16 cuts off and, at the point when transistor T20 ceases conducting, transistor T22 ceases conducting also, so that the raise relay RL1 is de-energised. This occurs when the alternator speed is 1 percent above the grid speed. At the same time transistor T23 cuts off so that its collector voltage drops towards −12 volts and effectively reduces the reference voltage at the emitter of transistor T20 so that transistor T20 is switched off independently of any speed variation. Diode D18 is switched off when transistor T23 ceases conducting.

Point H in the voltage matching unit VII is connected to point H in FIGURE 6, and the diode D20 ceases conducting when transistor T29 in the voltage matching unit is cut-off. This condition occurs only when the alternator voltage and the grid voltage are matched. It will be seen that pulses entering the change-over unit through the point F can energize the lower relay to lower the setting of governor 9 only on completion of voltage matching, so that there is no risk of paralleling the alternator with the grid system under conditions of voltage mis-match greator than those stipulated.

To prevent maloperation of the synchronizing apparatus, several checking circuits are incorporated which inhibit the closing of the contact breakers unless all the paralleling requirements are met.

FIGURE 9 shows a phase checking unit IX, which works on a different principle from the phase matching unit and has a wider working tolerance. Unit IX gives an output pulse in advance of the proper synchronizing instant at such a time that the phase matching unit output pulse occurs within the duration of the unit IX pulse. The secondaries S11 to S14 are so connected as to produce two smoothed beat waveforms, each of which is the inverse of the other. Both waveforms are smoothed, and one waveform is differentiated between choke CH2 and transistor T44. The waveforms are then fed into the circuit including transistors T45 and T46 which operates in such a manner that, when the magnitudes of the differentiated beat waveform and the inverted beat waveform are within about a half volt of each other (the tolerance is determined by the diode D37 in the emitter lead of transistor T46) transistors T45 and T46 are both cut off, and this section of the AND gate is opened. As the speed is increased the magnitude of the differentiated beat increases and hence the phase at which its voltage is the same as that of the inverted beat is advanced proportionately, so that voltage coincidence always occurs at a fixed time before exact synchronism of the alternator and grid voltages. This fixed time can be preset by selecting a suitable position for the slider of the potentiometer R107. The output at point S is applied to the AND gate 39.

The voltage checking unit shown in FIGURE 10 is basically the same as the left hand side of FIGURE 7, the relays RL3 and RL4 being omitted and the output at point H being such that it prevents closure of the circuit breakers unless the voltages are within a small percentage of each other. The signal at point H is applied to the AND gate 39.

The slip speed checking unit XI (see FIGURE 11) ensures that the contact breakers cannot close until the beat frequency (and thus the slip frequency) has fallen below a predetermined upper limit. A smoothed inverted beat waveform is produced by the circuit of FIGURE 12 and this waveform is fed via point R into a differentiator formed by capacitor C28 and resistor R132, so that the output of the emitter follower T55 is proportional to the beat frequency. When the magnitude of this voltage rises above that set by the reference level arrangement consisting of transistor T53, voltage dividers R126, R127 and the smoothing circuit comprising resistors R126, R127 and capacitor C27, transistor T54 remains cut off so that the signal at point Q does not prevent closure of the circuit breakers.

The above-speed checking unit XII operates on the same principle as the speed matching circuit, so that waveforms similar to those shown in FIGURE 3 are produced with a phase relationship which depends on whether the alternator frequency is greater or less than the grid system frequency.

Both the normal beat waveform, and the inverted phase shifted beat waveform, are smoothed and squared. The two squared waveforms are fed into an AND gate together with a signal which inhibits the output until the magnitude of the normal beat waveform is less than a predetermined value.

Thus the arrangement of capacitors C28 and C29 and of resistors R133 and R134 and of the bridge D41 produces a phase shifted beat waveform which is smoothed and then differentiated by the combination of capacitor C30 and resistor R137. Similarly the output from the transformers TR17 and TR18 is rectified in bridge D43, smoothed and then differentiated by the combination of capacitor C33 and resistor R141. Transistors T56 and T57 square the differentiated waveforms so that the voltage at the collector of each transistor changed from −12 volts to +12 volts depending upon the polarity of the base. Transistor T58 is an emitter follower and thus provides a low impedance source for the squaring transistor T59 while presenting a high impedance load to the bridge D7. The normal beat waveform is fed through transistor T58 to transistor T59, which squares the waveform about earth level so that as long as the voltage level of the normal beat is between −6 volts and earth, transistor T59 is conducting. The AND gate comprising resistor R147 and diodes D46, D47 and D48 is so arranged that the voltage on the collector of transistor T60 falls to −12 volts only when all three transistors T56, T60 and T57 are conducting.

The protective delay circuit XIII (FIGURE 13) prevents any possibility that the contact breakers might be caused to close when the automatic synchronizing apparatus is first switched on. When the synchronizing apparatus is switched on, the emitter of the transistor T61 must always be at a potential equal to about half that of its base, since initially capacitor C36 is discharged. Therefore transistor T61 will always initially be non-conducting with its collector at −12 volts so that, as transistor T62 is an emitter follower, no voltage exists across the relay RL5. As capacitor C36 proceeds to charge down to −12 volts through resistor R49, a condition is reached at which transistor T61 conducts, so that the emitter of transistor T62 rises to 0 volt, energizing the relay RL5. Relay RL5 has its normally open contacts in series with the contact breaker solenoid device 19, so that the contact breakers cannot close until a suitable delay has occurred after switching on of the apparatus.

The manner in which the voltage of the alternator is matched to the voltage of the grid may be by adjustment of the tap-setting of a tapped transformer interposed between the alternator and the supply system, the setting unit 35 then actuating the tap-changing mechanism of the transformer.

For the sake of simplicity, it has been assumed that the transformers of the various circuits are energized directly from the conductors 21A, 21B, 31A and 31B. In practice, it will be preferable to energize these transformers at, say, 110 volts and interposed suitable voltage step-down transformers between the conductors and these circuit transformers. This will, of course, be essential in a high voltage alternator and grid system.

Although the automatic synchronizing equipment which is described above is completely effective, it may be considered further to elaborate it in any particular installation, and the following description relates to various elaborations.

NUDGE CIRCUIT

Under abnormal operating conditions it is possible for the relative speed between the generator and the system to decrease to zero and remain at this value for an appreciable period but with an attendant phase angle error rendering the conditions unsuitable for synchronizing.

The nudge circuit would provide a lower speed pulse every 15 seconds when the following conditions exist:

(a) The generator speed is not being raised.
(b) Both incoming and running voltages are present.
(c) A voltage match exists.

These pulses reduce the generator frequency below that of the system and the synchronizing cycle is repeated.

NO VOLTAGE CIRCUIT

By this circuit speed and voltage changing are prevented if running and/or incoming voltages decrease to less than ⅔ of their rated values.

ALTERNATIVE CHANGEOVER CIRCUIT

This circuit provides for the case where it is required to synchronize at below grid frequency. The operation is as follows:

Raise speed when:

(a) Speed is less than that of the system.
(b) A raise pulse is produced.
(c) Both signal voltages are present.
(d) Speed is not being reduced.

Lower speed when:

(a) Generator speed is more than 98% of that of the system.
(b) A lower speed NUDGE pulse is produced.
(c) Above grid speed, with pulses once per beat cycle.
(d) Both signal voltages are present.
(e) The speed is not being raised.

PHASE MATCHING AND PHASE CHECKING UNITS 8 AND 9

FIGURE 15 shows the waveforms of the voltages occurring at the emitters of transistors T44 and T47 of FIGURE 9. As two conditions of voltage equality exist every beat cycle at points A and B, transistors T45 and T46 cease conducting twice every beat cycle, the first non-conduction occurring with an approximately constant time interval before phase coincidence and the second non-conduction occurring at phase coincidence.

Slip speed checking unit XI (FIGURE 11) provides a positive output at point Q at high slip speeds and effectively closes the AND gate 39 (FIGURE 2). However, this blocking signal only exists over a limited phase angle of the beat waveform and inherently disappears at phase coincidence. Hence, due to slightly mismatched characteristics circuit 9 can produce an output L into AND gate 39 which is not blocked by the slip speed checking unit.

Similarly the voltage produced as a function of slip speed at the emitter of T38 of FIGURE 8 undergoes a sign reversal at phase coincidence and hence an accompanying addition output at the junction of the collectors of transistors T36 and T41.

Similar short term memory circuits can be used to prevent circuits VIII and IX producing these unwanted outputs. FIGURE 16 shows a modification of the apparatus used in FIGURE 2, to include appropriate memory units, this modified apparatus including two AND units XVII and XVIII the circuits of which are shown in FIGURES 17 and 18 respectively.

Referring first to FIGURE 17 point L is connected through a resistor R201 to the base of a transistor T201, which is connected through a resistor R203 to the pole PP. The emitter of this transistor is earthed, and its collector is connected through the series combination of a resistor R205, a diode D201 (in the forward direction) and a resistor R207 to the base of the transistor T47 (see FIGURE 9). The collector of transistor T201 is connected through a capacitor C201 to the base of a transistor T203 the emitter of which is earthed. The base of this transistor is connected through a resistor R209 to pole NN. The junction of resistor R205 and diode D201 is connected firstly through a capacitor C203 to the pole NN and secondly through a diode D203 (in the reverse direction), a resistor R211 and a diode D205 (in a forward direction) to the collector of the transistor T203. The junction of resistor R211 and diode D205 is connected to the point Q (FIGURE 11). Also connected to the collector of transistor T203 are point C (FIGURE 4) through a diode D207 (in the forward direction), point S (FIGURE 12) through a diode D209 (in the forward direction), and point M (FIGURE 10) through a diode D211 (also in a forward direction). The collector of transistor T203 is also connected firstly through a resistor R213 to the pole NN, secondly through a resistor R215 and a diode D213 (in a reverse direction) to the base of a transistor T205, and thirdly through the resistor R215 and a resistor R217 to the pole PP. The emitter of transistor T205 is earthed, and its collector is connected through a resistor R219 to the pole NN. The base of transistor T205 is also connected through a resistor R221 to the pole PP and through the series combination of two resistors R223 and R225 to the pole NN. The collector of transistor T205 is connected through a capacitor C205 to the base of a transistor T207, the emitter of which is earthed and the collector of which is connected to the junction of resistors R223 and R225. The base of transistor T207 is also connected through a resistor R227 to the pole NN. The collector of transistor T205 is also connected through a resistor R229 to the base of an npn type transistor T209, the emitter of which is connected firstly to the pole N and secondly through a diode D215 (in the forward direction) to the transistor base. The collector of transistor T209 is connected through a resistor R231 to the pole P, and also through the operating coil RC201 of a relay to the pole P. This collector is also connected through a diode D217 (in the forward direction) to the pole P.

The circuit shown in FIGURE 18 is very similar to that shown in FIGURE 17, and the numerals used to indicate corresponding parts are those used in FIGURE 17, increased by 100. However, in the circuit of FIGURE 18 the resistor R301 (corresponding to the resistor R201) is connected not to the point L but to the commoned collectors of transistors T36 and T41 (see FIGURE 8). In addition, the point L (see FIGURE 9) is connected through an additional diode D312 (in the forward direction) to the collector of transistor T303 (corresponding to transistor T203 in FIGURE 17).

As will be seen from FIGURE 16, the contacts of the relays RC201 and RC301 are in series with each other and the solenoid 19 of the circuit breakers 17.

Under quiescent conditions, the transistors T201 and T301 are non-conducting and each represents a high impedance. As a negative-going beat waveform exists on the base of transistor T47 (FIGURE 9), the capacitors C203 and C303 respectively in the circuits of FIGURES 16 and 17 are discharged almost to the negative peak of the waveform through the associated silicon diode D201 and D301. The resistor R211 (or R311) is connected to the point Q on FIGURE 11, which point remains at the potential (−12 volts) of pole NN at slow slip speeds. Hence, the capacitor C203 (or 303) may only charge up positively through small leakage currents. When transistor T201 (or T301) conducts due to the presence of a negative signal on the resistor R201 (or R301), capacitor C203 (or C303) charges rapidly through the resistor R205 (or R305). Capacitor C201 (or C301) acts as a low impedance to this rapid voltage rise and hence transistor T203 (or T303) switches off for a period which depends on the time constant of the combination of capacitor C201 and resistor R209 (or the combination of capacitor C301 and resistor R309).

At high slip speeds, the input from point Q, connected to the resistor R211 (or R311), which has a relatively small value, goes positive and charges capacitor C203 (or C303) at a rate which is insufficient to switch transistor T203 (or T303) off. A negative pulse applied to resistor R201 (or R301) will make transistor T201 (or T301) conduct, but as capacitor C203 (or C303) is fully charged there will be no voltage change at the collector of transistor T201 (or T301).

By choosing suitable values for capacitors C203 and C303, and for resistors R201 and R301, the negative pulse applied to the resistor R201 (or R301) results in capacitor C203 (or C303) becoming fully charged, so that a second input to resistor R201 (or R301) would not result in an extra output at the collector of transistor T201 (or T301).

The two circuits of FIGURES 17 and 18 effectively prevent secondary outputs appearing and possibly causing incorrect synchronizing and as such they form a desirable adidtional feature of the synchronizing equipment.

ARRANGEMENT OF OUTPUT CIRCUITS

The arrangement of the outputs has been altered to improve the reliability of the system. This is achieved by forming two AND gates to replace AND gate 39 and using the output of each gate to drive separate relays each having contacts in series with the operating solenoid 19 of the paralleling circuit breaker.

To make the double output channels operate with a large degree of independence, the outputs of units XI and XIII are duplicated as shown in the block and circuit diagrams of the output arrangement, FIGURES 16 to 18.

As both the Phase Check unit FIGURE IX and the Phase Matcher FIGURE VIII feed into monostable circuits having pulse outputs of about .8 second and .3 second respectively, the "overlap" of contact closure is ill defined in terms of phase angle and so an output is taken from L of unit IX and fed into the AND gate associated with unit VIII. As output L is defined by a small voltage difference on the linear section of a beat envelope this is equivalent to an output existing for a particular phase angle and hence unit VIII must give an output within this small angular range to produce its 350 millisecond pulse.

AUTOMATIC LOAD PICK-UP CIRCUIT

In some instances there may be a requirement to leave the generator with a small amount of load immediately after synchronizing. Due to backlash in the governor and speeder motor systems it is found that only a negligible amount of load is taken-up on paralleling even though the slip speed was appreciable at the instant of connection.

Normally the automatic synchronizer is switched off automatically on synchronizing by means of auxiliary contacts on the paralleling circuit breaker FIGURE 2 item 19. Hence, to provide energy to operate the speeder motor in the raise direction after the equipment is switched off, a capacitor C401 of suitably large capacitance is charged up during the time when the synchronizing equipment is energized and discharged rapidly through a relay RL401 when the equipment is switched off. This relay is used to operate the speeder motor directly or through an interposing relay. The length of the pulse applied to the speeder motor is adjusted by including a preset resistance R401 in series with the relay coil as shown in FIGURE 19.

What we claim is:

1. Frequency matching means adapted to adjust the frequency of a first alternating voltage so that it matches the frequency of a second alternating voltage, comprising:

(a) circuit means by which the first and second voltages are combined to produce first and second beat waveforms, one of the beat waveforms being caused to lag the other;

(b) circuit means by which each beat waveform is squared;

(c) circuit means adapted to produce a first pulse train with the leading edges of the pulses produced by the leading edges of a first of the squared waveforms;

(d) circuit means adapted to produce a second pulse train with the leading edges of the pulses produced by the trailing edges of the said first squared waveform;

(e) circuit means by which the second squared waveform is compared with the first pulse train and with the second pulse train, this circuit means being adapted to produce a first output when the pulses of the first pulse train occur during the mark periods of the squared beat waveforms and providing a second output when the pulses of the second pulse train occur during the mark periods of the squared beat waveform; and (f) means arranged to regulate the frequency of the first alternating voltage and adapted to increase that frequency upon the occurrence of the first output and to decrease that frequency upon the occurrence of the second output.

2. Frequency matching means according to claim 1, in which the first and second alternating voltages are applied as inputs to the primaries of two separate transformers, each transformer including two secondaries and one secondary of each transformer being connected in series with one secondary of the other transformer to provide one of the two beat waveforms.

3. Frequency matching means according to claim 2, in which a phase shift is introduced into one of the two waveforms by a resistive-capacitive lag circuit.

4. Frequency matching means according to claim 3, in which the phase shift introduced is substantially 45 degrees.

5. Frequency matching means according to claim 1, in which each squared waveform is produced by a circuit which changes state as the beat amplitude rises above and falls below a fixed level, whereby the change of state occurs at a fixed phase angle on the beat waveform independent of the beat frequency as long as the beat amplitude is constant.

6. Frequency matching means according to claim 1, in which the operations carried out on the beat waveforms are carried out in transistor circuits.

7. Frequency matching means according to claim 1, in which the second squared waveform is compared with the first pulse train in a first diode AND gate and the second squared waveform is compared with the second pulse train in a second diode AND gate, and the two AND gates control a bistable circuit which in one stable state provides the first output and in its other stable state provides the second output.

References Cited

UNITED STATES PATENTS

| | | | |
|---|---|---|---|
| 2,235,403 | 3/1941 | Gullksen | 307—87 |
| 2,689,919 | 9/1954 | Lytle | 307—87 |
| 2,817,023 | 12/1957 | Rice | 307—87 |
| 2,885,568 | 5/1959 | Reeder | 307—87 |
| 3,069,555 | 12/1962 | Kessler | 307—87 |
| 3,069,556 | 12/1962 | Apfelbeck | 307—87 |
| 3,210,556 | 10/1965 | Billings | 307—87 |

ORIS L. RADER, *Primary Examiner.*

T. J. MADDEN, *Assistant Examiner.*